(12) United States Patent
Chen

(10) Patent No.: US 12,361,150 B2
(45) Date of Patent: Jul. 15, 2025

(54) DATA PROCESSING METHOD AND APPARATUS BASED ON BLOCKCHAIN NETWORK, DEVICE, AND STORAGE MEDIUM

(71) Applicant: TENCENT TECHNOLOGY (SHENZHEN) COMPANY LIMITED, Shenzhen (CN)

(72) Inventor: Zimin Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 230 days.

(21) Appl. No.: 18/325,180

(22) Filed: May 30, 2023

(65) Prior Publication Data

US 2023/0325521 A1    Oct. 12, 2023

Related U.S. Application Data

(63) Continuation of application No. PCT/CN2022/118182, filed on Sep. 9, 2022.

(30) Foreign Application Priority Data

Oct. 27, 2021 (CN) .......................... 202111258815.6

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01); *H04L 9/32* (2013.01);
(Continued)

(58) Field of Classification Search
None
See application file for complete search history.

(56) References Cited

U.S. PATENT DOCUMENTS 10,469,263 B2 * 11/2019 Schukai ................ H04L 9/3231
10,540,344 B2 *  1/2020 Shen ....................... G06F 16/00
(Continued)

FOREIGN PATENT DOCUMENTS

CN          107257341 A       10/2017
CN          111429322 A        7/2020
(Continued)

OTHER PUBLICATIONS

The World Intellectual Property Organization (WIPO) International Search Report for PCT/CN2022/118182 Nov. 14, 2022 7 Pages (including translation).

*Primary Examiner* — Backhean Tiv
(74) *Attorney, Agent, or Firm* — ANOVA LAW GROUP, PLLC

(57) ABSTRACT

A data processing method based on a blockchain network includes: transmitting a first data clearing request to a consensus node of the blockchain network and receiving claim data returned by the consensus node in response to the first data clearing request, the returned claim data being claim data associated with a holder node in the blockchain network obtained by clearing; generating identity presentation data of the holder node based on the claim data; determining a first visible node identification of a node having access to the identity presentation data; and storing the identity presentation data and the first visible node identification in a blockchain of the blockchain network.

20 Claims, 8 Drawing Sheets

(51) Int. Cl.
 *H04L 9/32* (2006.01)
 *H04L 9/40* (2022.01)
 *H04L 67/1095* (2022.01)
 *H04L 67/1097* (2022.01)

(52) U.S. Cl.
 CPC ............ *H04L 9/40* (2022.05); *H04L 67/1095* (2013.01); *H04L 67/1097* (2013.01)

(56) References Cited

U.S. PATENT DOCUMENTS

| | | | | |
|---|---|---|---|---|
| 10,805,068 | B1* | 10/2020 | Leise | G07C 5/0816 |
| 10,839,395 | B2* | 11/2020 | Simons | H04L 9/3239 |
| 10,896,418 | B2* | 1/2021 | Gonzales, Jr. | G06F 21/6218 |
| 10,992,676 | B2* | 4/2021 | Zlotnick | G06F 21/64 |
| 10,999,283 | B2* | 5/2021 | Liu | H04L 63/10 |
| 11,194,919 | B2* | 12/2021 | Karia | G06Q 20/3825 |
| 11,233,641 | B2* | 1/2022 | Soundararajan | G06Q 20/3829 |
| 11,250,466 | B2* | 2/2022 | Soundararajan | H04L 9/3239 |
| 11,263,315 | B2* | 3/2022 | Bhamidipati | H04L 63/123 |
| 11,336,451 | B2* | 5/2022 | Qiu | H04L 9/3226 |
| 11,348,104 | B2* | 5/2022 | Cheng | H04L 63/083 |
| 11,356,443 | B2* | 6/2022 | Soundararajan | H04L 63/0815 |
| 11,403,674 | B2* | 8/2022 | Soundararajan | H04L 9/50 |
| 11,743,045 | B2* | 8/2023 | Kramer | H04L 9/32 705/67 |
| 11,823,120 | B2* | 11/2023 | Padmanabhan | G06Q 10/087 |
| 11,836,259 | B2* | 12/2023 | Zlotnick | G06F 21/62 |
| 2020/0044831 | A1* | 2/2020 | Soundararajan | H04L 9/50 |
| 2020/0294032 | A1* | 9/2020 | Cheng | H04L 63/0861 |
| 2020/0366485 | A1* | 11/2020 | Qiu | H04L 9/3247 |
| 2023/0087138 | A1* | 3/2023 | Li | H04L 63/0442 713/150 |
| 2023/0325521 | A1* | 10/2023 | Chen | H04L 67/1095 726/19 |
| 2023/0360046 | A1* | 11/2023 | Zhu | G06Q 40/123 |
| 2024/0160755 | A1* | 5/2024 | Shi | G06F 21/606 |
| 2025/0053976 | A1* | 2/2025 | Zhu | G06Q 20/3825 |

FOREIGN PATENT DOCUMENTS

| | | |
|---|---|---|
| CN | 112307455 A | 2/2021 |
| CN | 113010871 A | 6/2021 |
| CN | 113065849 A | 7/2021 |

* cited by examiner

DATA PROCESSING METHOD AND APPARATUS BASED ON BLOCKCHAIN NETWORK, DEVICE, AND STORAGE MEDIUM

CROSS-REFERENCES TO RELATED APPLICATIONS

This application is a continuation application of PCT Patent Application No. PCT/CN2022/118182, entitled "DATA PROCESSING METHOD AND APPARATUS BASED ON BLOCKCHAIN NETWORK, AND DEVICE AND STORAGE MEDIUM" and filed on Sep. 9, 2022, which claims priority of Chinese Patent Application No. 202111258815.6, entitled "DATA PROCESSING METHOD BASED ON BLOCKCHAIN NETWORK AND RELATED DEVICE", filed by the China National Intellectual Property Administration on Oct. 27, 2021, the entire contents of both of which are incorporated herein by reference.

FIELD OF THE TECHNOLOGY

The present disclosure relates to the field of computer technology and artificial intelligence, and in particular, to a data processing method based on a blockchain network, a data processing apparatus based on a blockchain network, a computer device, a computer-readable storage medium, and a computer program product.

BACKGROUND OF THE DISCLOSURE

With the rapid growth of the computer technology, more and more users or enterprises choose to employ digital identity to prove their true identity; digital identity is obtained by digitizing the user's identifiable information (e.g., user name and behavior information). Digital identity can improve the identification efficiency to some extent.

However, it is found in practice that there is a risk of data leakage in the related circulation and storage methods of the digital identity. For example, during the issuer that generated the digital identity transmits the user's digital identity directly to the holder, the digital identity is likely to be intercepted, and the user's personally identifiable information is thus revealed. Therefore, how to improve the data security has become a research focus.

SUMMARY

According to various embodiments provided in the present disclosure, there are provided a data processing method and apparatus based on a blockchain network, a device, a computer-readable storage medium, and a computer program product.

In an aspect, the embodiments of the present disclosure provide a data processing method based on a blockchain network, executed by a holder node in the blockchain network, the method including: transmitting a first data clearing request to a consensus node of the blockchain network and receiving claim data returned by the consensus node in response to the first data clearing request, the returned claim data being claim data associated with the holder node obtained by clearing; generating identity presentation data of the holder node based on the claim data, the identity presentation data indicating an identity of the holder node; determining a first visible node identification of a node having access to the identity presentation data; and storing the identity presentation data and the first visible node identification in a blockchain of the blockchain network.

In another aspect, the embodiments of the present disclosure provide a data processing method based on a blockchain network, executed by a consensus node in the blockchain network, the method including: receiving a first data clearing request transmitted by a holder node in the blockchain network, the first data clearing request being configured to request to clear claim data associated with the holder node; perform data clearing and obtaining the claim data associated with the holder node in response to the first data clearing request, returning the claim data to the holder node; and receiving a first storage request transmitted by the holder node and storing an identity presentation data and a first visible node identification comprised in the first storage request in a blockchain of the blockchain network, wherein the identity presentation data is generated by the holder node based on the claim data, and the first visible node identification indicating a node having access to the identity presentation data is determined by the holder node.

In another aspect, the embodiments of the present disclosure provide a data processing apparatus based on a blockchain network, including: a transmitting unit, configured to transmit a first data clearing request to a consensus node of the blockchain network and receive claim data returned by the consensus node in response to the first data clearing request, the returned claim data being claim data associated with a holder node of the blockchain network obtained by clearing; and a processing unit, configured to generate identity presentation data of the holder node based on the claim data, the identity presentation data indicating an identity of the holder node, the processing unit being further configured to determine a first visible node identification of a node allowed to access the identity presentation data, and the processing unit being further configured to store the identity presentation data and the first visible node identification in a blockchain of the blockchain network.

In another aspect, the embodiments of the present disclosure provide a data processing apparatus based on a blockchain network, including: a receiving unit, configured to receive a first data clearing request transmitted by a holder node in the blockchain network, the first data clearing request being configured to request to clear claim data associated with the holder node; and a processing unit, configured to perform data clearing and obtain the claim data associated with the holder node by clearing in response to the first data clearing request, return the claim data to the holder node to enable the holder node to generate identity presentation data of the holder node based on the claim data, the identity presentation data indicating an identity of the holder node, and determine a first visible node identification arranged to access the identity presentation data, and the processing unit being further configured to receive a first storage request transmitted by the holder node and store the identity presentation data and the first visible node identification included in the first storage request in the blockchain of the blockchain network.

In another aspect, the embodiments of the present disclosure provide a computer device, including one or more processors and one or more memory, the one or more memory being configured to store at least one computer program therein, and the at least one computer program being loaded and executed by the one or more processors to implement the data processing method based on a blockchain network described above.

In another aspect, the embodiments of the present disclosure provide a non-transitory computer-readable storage medium, configured to store at least one computer program therein, the at least one computer program being loaded and executed by one or more processors to implement the data processing method based on a blockchain network described above.

The details of one or more embodiments of the present disclosure are set forth in the drawings and description below. Other features, objects, and advantages of the present disclosure will be apparent from the specification, drawings, and claims.

BRIEF DESCRIPTION OF THE DRAWINGS

In order to illustrate the embodiments of the present disclosure or the technical solutions in the related art more clearly, the drawings that need to be used in the description of the embodiments or the related art will be briefly described below. It is apparent that the drawings in the following description are only some embodiments of the present disclosure.

DESCRIPTION OF EMBODIMENTS

In conjunction with the drawings in the embodiments of the present disclosure, the technical solutions of the embodiments of the present disclosure will be clearly and completely described below. It is apparent that the embodiments described are only some, but not all embodiments of the present disclosure. Other embodiments can be obtained by those skilled in the art based on the embodiments of the present disclosure without creative work, which falls within the scope of protection of the present disclosure.

The user information (including but not limited to user equipment information and user personal information) and data (including but not limited to data used for analysis, stored data, and displayed data) involved in the present disclosure are both information and data authorized by the user or fully authorized by all parties.

The embodiments of the present disclosure relate to a blockchain technology, and the relevant terms and concepts of the blockchain technology are briefly introduced below.

Figure 1A:
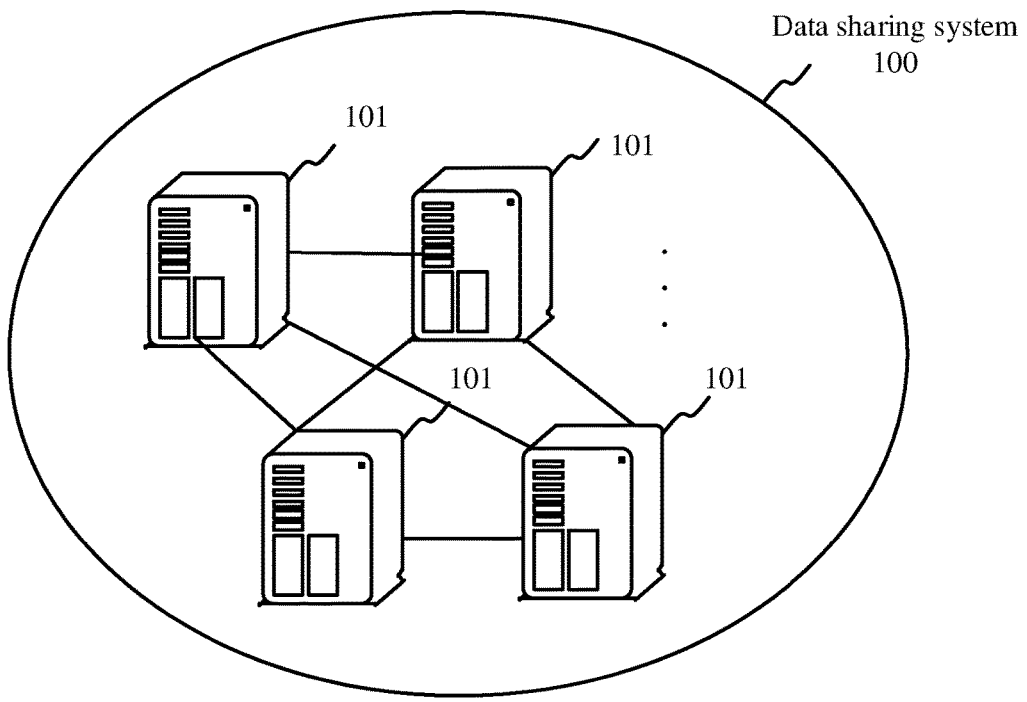
FIG. 1a shows an architecture diagram of a data sharing system provided in an exemplary embodiment of the present disclosure.

A blockchain network can be understood as a data sharing system 100, and the data sharing system 100 can refer to a system configured to perform data sharing between the nodes. An exemplary structure of the data sharing system 100 can be seen in FIG. 1a. As shown in FIG. 1a, a plurality of nodes 101 may be included in the data sharing system 100, and the plurality of nodes 101 may refer to various clients (or terminal devices, servers, and the like) in the data sharing system 100. To ensure information intercommunication in the data sharing system 100, the information connection may cover each of the nodes in the data sharing system 100 so that the information transmission and information sharing can be enabled between the nodes. The way to enable the information connection between the nodes may include the following. Each node in the data sharing system 100 has a node identification corresponding thereto, and each node in the data sharing system 100 can store node identifications of other nodes in the data sharing system 100. As such, any node can enable the information sharing based on the node identifications of other nodes (such as broadcasting the generated block to other nodes in the data sharing system 100). Each node may maintain a node identification list as shown in the following table, and the node name and the node identification are correspondingly stored in the node identification list. The node identification can be an Internet Protocol (IP) address and any other information which can be used for identifying the node, and Table 1 only takes the IP address as an example for explanation.

TABLE 1

| Node identification list | |
| --- | --- |
| Node name | Node identification |
| Node 1 | 117.114.151.174 |
| Node 2 | 117.116.189.145 |
| ... | ... |
| Node S (S is a positive integer) | xx.xx.xx.xx |

Figure 1B:
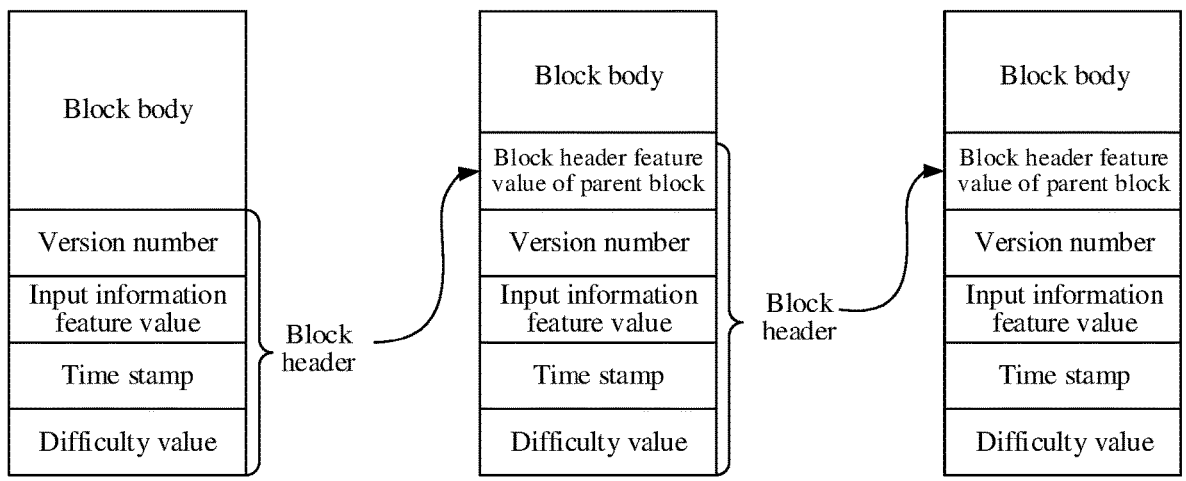
FIG. 1b shows a schematic structural diagram of a block provided in an exemplary embodiment of the present disclosure.

Each node in the data sharing system 100 stores an identical blockchain. A blockchain or block chain is a new application mode of the computer technologies, including distributed data storage, peer to peer (P2P) transmission, consensus mechanism, and encryption algorithm. The blockchain is essentially a decentralized database and a string of data blocks produced in association with using a cryptographic method. Each data block includes a batch of the network transaction information for verifying the validity of the information (anti-counterfeiting) and generating the next block. The blockchain is composed of a plurality of blocks. Each block includes input information, and the node realizes to store the input information by storing the blockchain. The schematic structural diagram of a block can be seen in FIG. 1b. As shown in FIG. 1b, a starting block of the block includes a block header and a block body. An input information feature value, a version number, a time stamp, and a difficulty value are stored in the block header, and the input information is stored in the block body. The next block of the starting block takes the starting block as a parent block, and the next block also includes a block header and a block body. The block header stores an input information feature value of the current block, a block header feature value of a parent block, a version number, a time stamp, and a difficulty value. It can deduce the rest from this so that the block data stored in each block in the blockchain is associated with the block data stored in the parent block, ensuring the security of the input information in the block. The node in the data sharing system 100 performs consensus on input information. Besides, after the consensus is successful, a process of block to be uploaded (namely, adding a block to a blockchain) generated by the input information may include: performing, by other nodes in the data sharing system 100, consensus on the input information according to a consensus algorithm when any node in the data sharing system 100 receives the input information; generating a block by the input information after the consensus is successful; and adding the block to a blockchain, thereby realizing the distributed storage of the input information and ensuring that the data stored on all nodes in the data sharing system 100 is consistent. The above node that performs consensus on the input information according to the consensus algorithm, generally referred to as a consensus node, is described herein.

As can be seen from the above relevant introductions to the block in the blockchain, the block in the blockchain includes the block header and the block body, and the block body is used for storing the input information. Then the nodes in the blockchain network may be distinguished as full nodes and light nodes based on whether the block in the blockchain included in the node includes a full amount of the input information, particularly whether the block body of each block in the blockchain includes a full amount of the input information. Distinguishing the full nodes from the light nodes is achieved by determining whether the nodes include the full amount of data of the block. The blockchain in the full node synchronizes with all data of the block (namely, a full amount of input information), including the relevant information such as the block header, the block body, and the transaction data of the block. By contrast, the light node only synchronizes with the block header of each block in the blockchain network and the transaction data related to the light node. In one embodiment, each block head in the light node is not connected into a blockchain, namely, the light node does not include a blockchain. In another embodiment, each block header in the light node may still be connected to form a blockchain, the block body of some blocks in the blockchain is empty (e.g., does not include the input information), and the block body of some blocks is not empty (e.g., includes the transaction data related to the light node). To facilitate the distinction between a blockchain including a full amount of data and a blockchain including only a block header (and part of the transactional data), the embodiments of the present disclosure refer to the blockchain including a full amount of data as a blockchain and the blockchains including only a block header (or part of the input information) as a sub-blockchain, as described herein.

In addition, the light node may include a special purpose vehicle (SPV) node. The SPV node has a data clearing/settlement capability, and data clearing capability can be simply understood as: synchronizing with the transaction data related to itself (namely, the SPV node) from the full node (in particular, the blockchain included in the full node), and supporting the capability of determining visible node identification(s) of node(s) that are allowed access to the transaction data uploaded to the blockchain in response to an operation of setting the visible node identification. As such, only a node corresponding to the set visible node identification can acquire the transaction data from the blockchain, which improves the data security to some extent. In the embodiments of the present disclosure, the light node includes a sub-blockchain, and the block body of some blocks in the sub-blockchain includes the transaction data related to the light node, as described herein.

Based on the above relevant introductions to the blockchain technology, the embodiments of the present disclosure provide a data processing system based on a blockchain network. The data processing system can be referred to as a decentralized ID (DID). Under different identity verification scenarios, the data processing system can realize the on-chain circulation and decentralized storage of data involved in different identity verification scenarios (namely, the data is stored in a distributed manner in the consensus node included in the blockchain network). For example, in response to that the identity verification scenario is an education verification scenario, the data processing system can implement the decentralized storage of the user's academic certificate (such as information or a certificate for proving the user's educational background) and on-chain circulation of the academic certificate. It improves the security of the academic certificate to some extent.

Figure 1C:
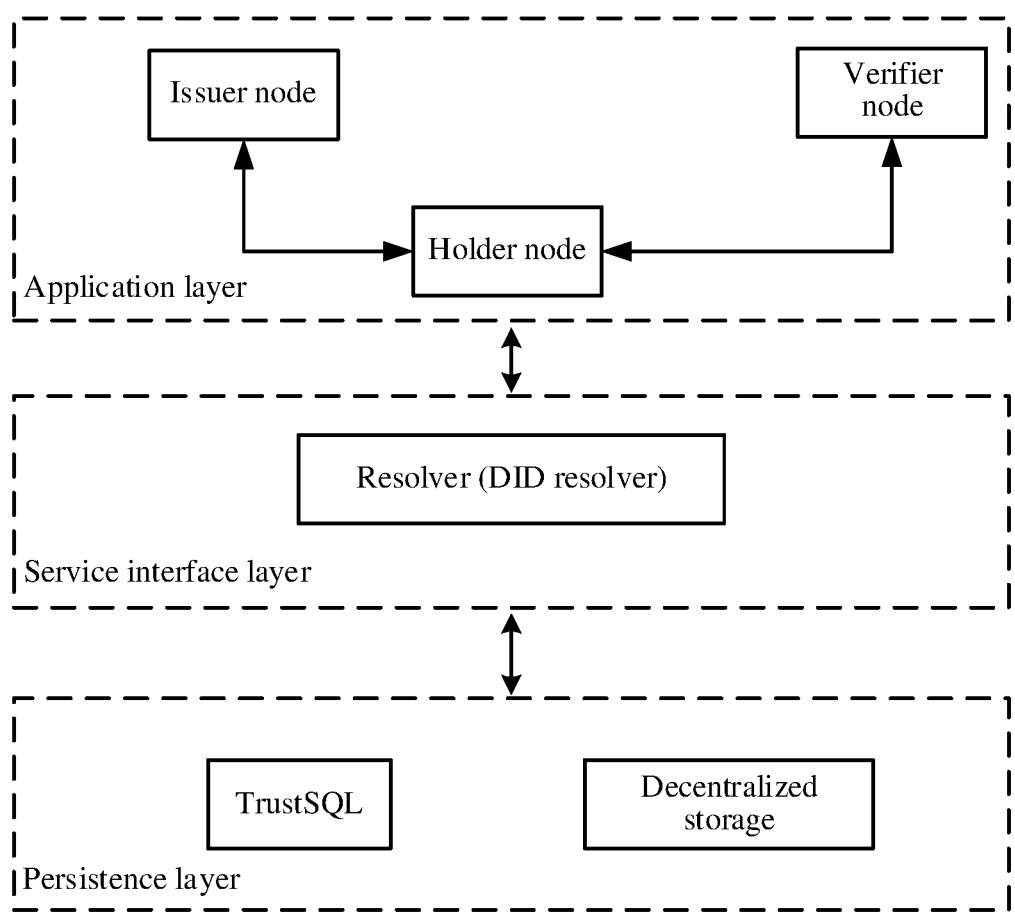
FIG. 1c shows an architecture diagram of a data processing system provided in an exemplary embodiment of the present disclosure.
Figure 1D:
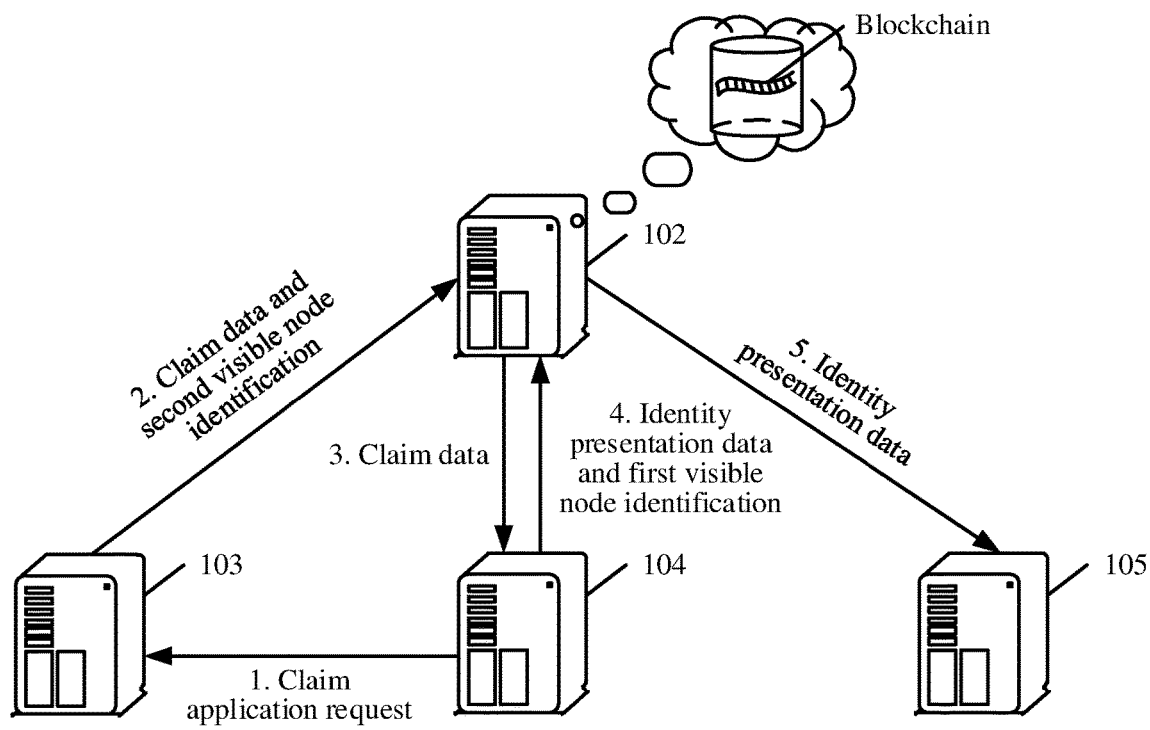
FIG. 1d shows a schematic structural diagram of a data processing system provided in an exemplary embodiment of the present disclosure.

The schematic illustration of the overall structure of the data processing system can be seen in FIG. 1*c*. As shown in FIG. 1*c*, the data processing system includes in a top-down manner: an application layer, a service interface layer, and a persistence layer. The application layer provides an application service based on the blockchain for the user to use. The service interface layer includes a resolver configured to externally provide the functions such as a decentralized service and data acquisition. The persistence layer includes a service interface (such as an API interface and a SQL interface) configured to provide the function of the basic service of the blockchain for the upper layer application scenario. Further, the data processing system shown in FIG. 1*c* may also be represented by the schematic structural diagram shown in FIG. 1*d*. As shown in FIG. 1*d*, the data processing system includes: a consensus node 102, an issuer node 103, a holder node 104, and a verifier node 105. Each node included in the data processing system (such as the consensus node 102, the issuer node 103, the holder node 104, and the verifier node 105) may refer to: a computer device or an application program (an application for short) running on the computer device. The computer device may include, but is not limited to: intelligent devices such as a smart phone, tablet computer, portable personal computer, mobile Internet device, intelligent television, vehicle-mounted device, and head-mounted device. The application running on the computer device may refer to the computer-readable instruction for performing one or more specific functions and may include, but is not limited to: a client installed on the computer device, an applet that can be used without downloading and installing the applet, and a web application opened by a browser. The embodiments of the present disclosure do not limit the number and types of the nodes included in the data processing system. For example, in FIG. 1*a*, the number of the consensus nodes 102 is 1 and the number of the verifier nodes 105 is 1. But in practice, the number of the consensus nodes 102 may be greater than 1 (e.g., 100) and the number of the verifier nodes 105 may be greater than 1 (e.g., 50).

Figure 1E:
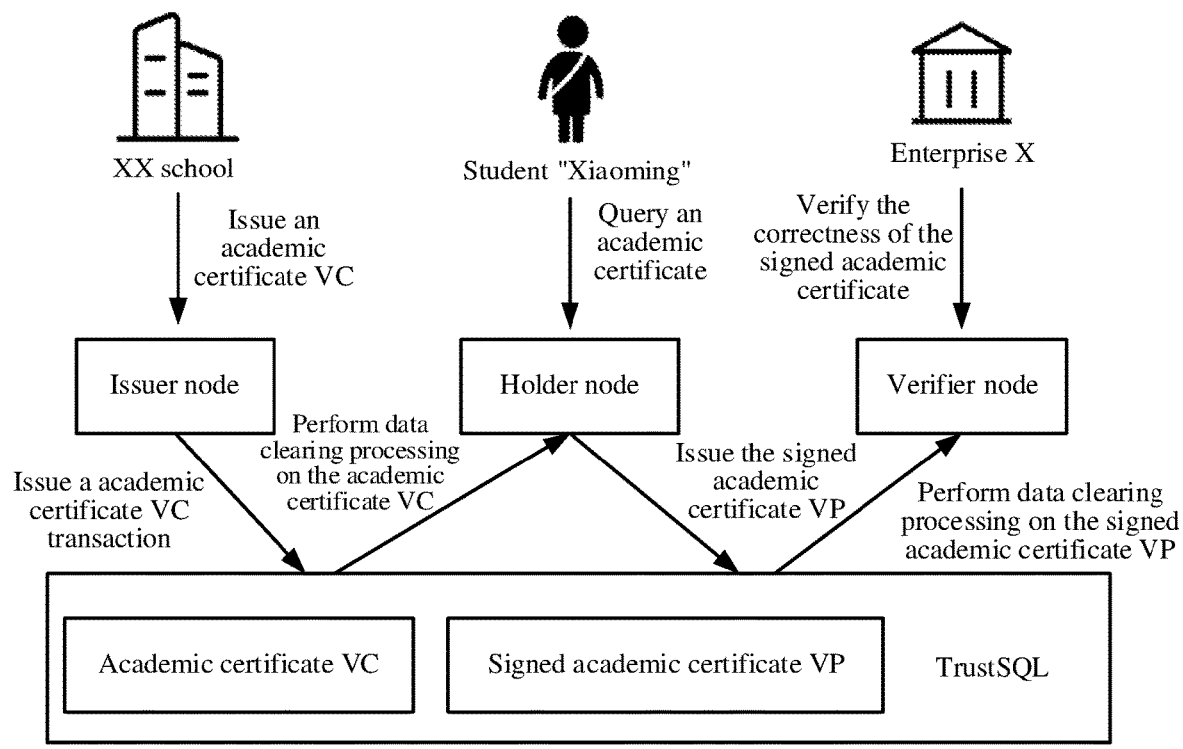
FIG. 1e shows a schematic illustration of an education verification scenario provided in an exemplary embodiment of the present disclosure.

Based on the data processing system shown in FIG. 1d, the embodiments of the present disclosure provide a data processing scheme based on a blockchain network. In the data processing scheme, the circulation process of the data between various light nodes (such as the issuer node 101, the holder node 102, and the verifier node 105) is realized by the blockchain, and the data is stored in the blockchain included in the full node, avoiding the risk of the data leakage and improving the data security. In connection with the various nodes included in the data processing system shown in FIG. 1d and by taking the academic certificate verification scenario shown in FIG. 1e as an example, the general flow of the data processing scheme is given below:

(1) Holder Node 104.

The holder node 104 is a node used by a target user (e.g., any user) who has a need to apply for the claim data (e.g., the academic certificate). For example, if the student "Xiaoming" has a need to apply for the academic certificate to the XX school, the student "Xiaoming" may transmit a claim application request to the issuer node 103 (such as a node used by the XX school) by the holder node 104; the issuer node 103 generates the academic certificate of the student "Xiaoming" in response to the claim application request. The node type of the holder node 104 is a light node, namely, only some blocks in the blockchain included in the holder node 104 include the transaction data related to the holder node 104 (such as the entrance information and education information about the student "Xiaoming").

(2) Issuer Node 103.

The issuer node 103 is a node used by a user for signing and issuing the claim data. In the education verification scenario, the issuer node 103 may be a node used by the XX school. As such, when the issuer node 103 receives the claim application request transmitted by the holder node 104, the issuer node 103 may use the object identification (such as the identity identification (e.g., a user name, a user number, and a user ID) of the target student "Xiaoming" using the holder node) of the holder node 104 object carried in the claim application request to sign and issue the academic certificate of the student "Xiaoming". In addition, the issuer node determines a second visible node identification of a node allowed to access the academic certificate of the student "Xiaoming". For example, if the node identification of the node X in the blockchain network is set as the second visible node identification, then the node X can acquire (such as download and cache) the academic certificate of the student "Xiaoming" from the blockchain. Then the issuer node 103 transmits the academic certificate of the student "Xiaoming" and the second visible node identification of the node allowed to access the academic certificate to the consensus node 102, so that the consensus node 102 uploads the academic certificate to the blockchain for storage after the consensus on the academic certificate is successful. The node type of the issuer node 103 is a light node. For example, the issuer node 103 only includes data related to itself, e.g., historically signed and issued academic certificates of one or more students.

(3) Consensus Node 102.

The consensus node 102 can use a consensus algorithm to perform consensus processing on the received data, generate a block by the data, and store the block in the blockchain after the consensus is successful. The consensus algorithm may include, but is not limited to: workload certification, right and interest certification, and delegated right and interest certification. The consensus algorithms used in different business scenarios are different, and the embodiments of the present disclosure do not limit the type of consensus algorithm. Based on the above description, it can be readily seen that the node type of the consensus node 102 is a full node, i.e., the blockchain included in the consensus node 102 includes a full amount of data in the blockchain network. Specifically, after the consensus node 102 receives the academic certificate and the second visible node identification of the node allowed to access the academic certificate transmitted by the issuer node 103, the consensus node can perform consensus on the academic certificate and the second visible node identification. After the consensus is successful, the consensus node generates a block based on the academic certificate and the second visible node identification and stores the block in the blockchain, realizing the broadcast of the block (namely, the academic certificate and the second visible node identification) in the blockchain network. In this way, other nodes (full nodes and/or light nodes) in the blockchain network can synchronize with the blocks including the academic certificates and the second visible node identifications from the blockchain of the consensus node. For example, if the node identification of the holder node 104 is set as the second node visible identification of the node allowed to access the academic certificate, the holder node 104 may transmit a first data clearing request to the consensus node. As such, the consensus node clears the claim data associated with the holder node 104 in a blockchain and returns the claim data to the holder node 104. Besides, the holder node 104 signs the claim data and stores the identity presentation data (such as the signed academic certificate) and the first visible node identification of the node allowed to access the identity presentation data in the blockchain.

(4) Verifier Node 105.

The verifier node 105 is a node used by a user having verification identity presentation data (such as the academic certificate). In an education verification scenario, the verifier node 105 may be a node used by a recruiting unit (such as an enterprise X having the need to recruit employees). As such, the verifier node 105 may synchronize with the transaction data related to itself from the blockchain in the blockchain network and perform identity verification on the identity presentation data included in the transaction data after acquiring the transaction data. For example, the blockchain in the blockchain network includes the signed academic certificate of the student "Xiaoming" uploaded by the holder node 104. When uploading the signed academic certificate, the node identification of the verifier node X is set as the first visible node identification of the node allowed to access the signed academic certificate, then the verifier node X can synchronize to the signed academic certificate from the blockchain and perform identity verification on the signed academic certificate. The identity verification herein can verify the authenticity of the signed academic certificate and the like, and the implementation of the identity verification is not limited in the embodiments of the present disclosure.

It can be seen based on the above description that the data processing scheme based on a blockchain network mentioned in the embodiments of the present disclosure uploads the data (such as the above claim data or identity presentation data) in combination with the tamper-resistance of the blockchain so as to realize the decentralized storage of the data. In addition, the data circulation of the data and the setting of the visible node identification (such as the above first visible node identification and second visible node identification) are performed on the blockchain through the data clearing capability of the holder node. As such, the secure circulation of the data between the issuer node, the holder node, and the verifier node is effectively protected so that only the designated node can access the data, effectively reducing the risk of data leakage and improving the data security.

Based on the data processing scheme based on a blockchain network described above, the embodiments of the present disclosure provide a more detailed data processing method based on a blockchain network. The data processing method based on a blockchain network provided in the embodiments of the present disclosure will be described in detail with reference to the drawings.

Figure 2:
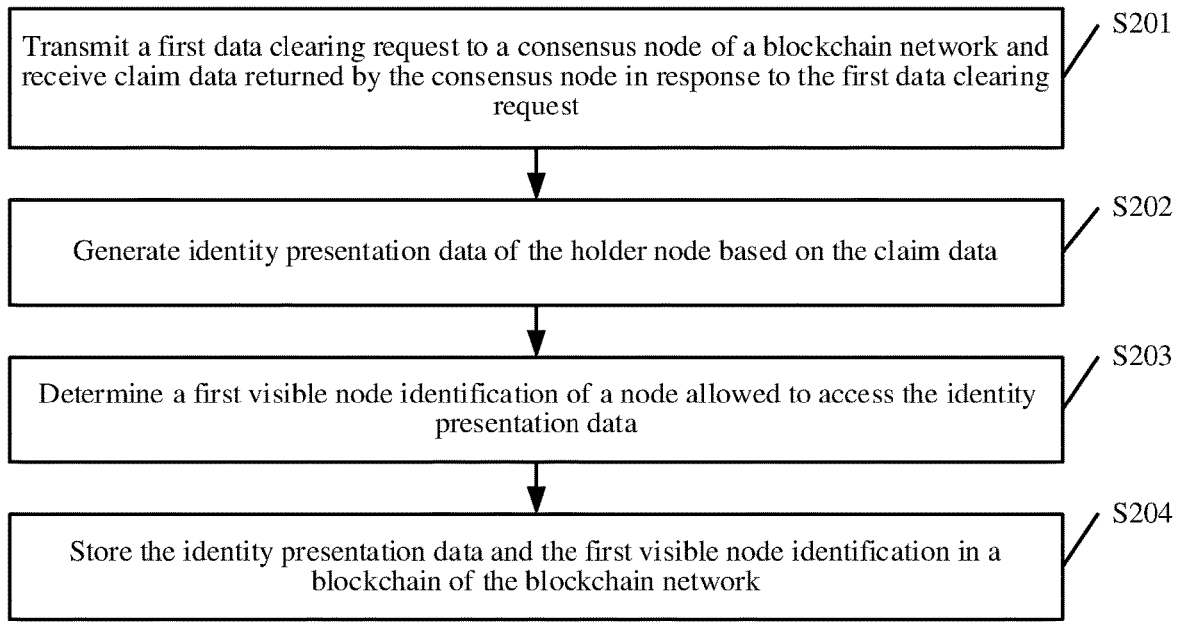
FIG. 2 shows a flowchart of a data processing method based on a blockchain network provided in an exemplary embodiment of the present disclosure.

Reference will be made to FIG. 2, and FIG. 2 shows a flowchart of a data processing method based on a blockchain network provided in an exemplary embodiment of the present disclosure. The data processing method can be performed by the holder node 104 in the system shown in FIG. 1d, and the data processing method includes, but is not limited to steps S201-S204.

S201: Transmit a first data clearing request to a consensus node of a blockchain network and receive claim data returned by the consensus node in response to the first data clearing request, the returned claim data being claim data associated with a holder node obtained by clearing.

The first data clearing request is a data diligence request transmitted by the holder node to the consensus node, and the first data clearing request is configured to request to clear the claim data associated with the holder node from the consensus node and returning the claim data to the holder node. The claim data associated with the holder node refers to verifiable claims (VC), which are claim files formed by the issuer node endorsing an attribute of the holder node based on an object identification corresponding to the holder node. For example, in an education verification scenario, the issuer node may refer to a node used by a school, and the claim data refers to the academic certificate signed and issued by the school based on a student's identity identification DID (e.g., student ID and number). Specifically, the object identification corresponding to the holder node can be carried in the first data clearing request. As such, the consensus node, in response to the first data clearing request, can clear the claim data associated with the holder node from the blockchain based on the identity identification DID that is carried in the first data clearing request. The object identification of the holder node may refer to the identity identification DID of a target user using the holder node to make a claim application, and the object identification is an identity identifier representing the identity of the target user. The identity identifier may be a string composed of multiple characters, and the characters may include at least one of the following: Chinese characters, English characters, numbers, and punctuation marks (e.g., comma ",", full stop ".", and parenthesis "[ ]").

S202: Generate identity presentation data of the holder node based on the claim data.

S203: Determine a first visible node identification of a node allowed to access the identity presentation data.

In steps S202-S203, the identity presentation data may refer to a verifiable presentation (VP), which is generated by the holder node based on the claim data and represents the identity of the holder node. In particular, after the holder node obtains the claim data from the consensus node by clearing, the claim data may be signed to generate the identity presentation data of the holder node. Signing the claim data may refer to digitally signing the claim data. The digital signature is a piece of digit string that cannot be forged by others and can be generated only by the information transmitter (such as the holder node), and this piece of digit string is also valid proof of the authenticity of the information transmitted by the information transmitter. Methods of digitally signing may include, but are not limited to: Hash algorithm (such as Message-Digest (MD)), secure Hash algorithm (SHA), digital signature algorithm (DSA), elliptic curve digital signature algorithm (ECDSA), and elliptic curve digital signature algorithm. The embodiments of the present disclosure do not limit which digital signature algorithm is specifically used to sign the claim data, which is described herein.

For example, signing the claim data (e.g., the academic certificate of the student "Xiaoming") in the education verification scenario may include: signing, by the student "Xiaoming", the academic certificate by the holder node and generating the signed academic certificate (namely, identity presentation data). Since the signed academic certificate includes the digital signature of the student "Xiaoming", the authenticity of the signed academic certificate can be effectively proved based on the signed academic certificate.

The embodiments of the present disclosure also allow the holder node to provide the visibility setting on the identity presentation data. The visibility setting can be simply understood as a process that the holder node determines the node identification of a node allowed to access the identity presentation data in response to the visible node identification setting operation. In an identity authentication scenario, a holder node (specifically a target user using the holder node) can set different nodes to have a right to access identity presentation data. For example, in an education verification scenario, if the student "Xiaoming" wants the recruiting unit A and the recruiting unit B to access the signed academic certificate by himself and does not want the recruiting unit C to access it, the student "Xiaoming" can set a visible node identification as a node identification corresponding to each of the recruiting unit A and the recruiting unit B by the holder node. Then the holder node determines the first visible node identification of the node allowed to access the signed academic certificate as the node identification corresponding to each of the recruiting unit A and the recruiting unit B in response to the setting operation. By the visibility setting of the identity presentation data, only the designated node can access the identity presentation data, greatly reducing the risk of the leakage of the identity presentation data and improving the data security.

S204: Store the identity presentation data and the first visible node identification in a blockchain of the blockchain network.

In particular, the presentation transaction data may be generated based on the identity presentation data and the first visible node identification, and then the presentation transaction data may be transmitted to the consensus node in the blockchain network to enable the consensus node to generate a block based on the presentation transaction data and add the block to a blockchain. As such, the identity presentation data and the first visible node identification can be stored in the blockchain of the blockchain network. The embodiments of the present disclosure allow to set a plurality of first visible node identifications of nodes allowed to access the identity presentation data, and thus the presentation transaction data provided in the embodiments of the present disclosure may include a visible list. The visible list includes one or more first visible node identifications of nodes allowed to access the identity presentation data. When there is an access request for accessing the identity presentation data, the consensus node may perform identification hit processing on the visible list based on the visible list included in the presentation transaction data so as to detect whether the access node transmitting the access request has a right to access the identity presentation data. If the visible list includes a node identification of the access node transmitting the access request, it is determined that the access node has the right to access the identity presentation data and transmits the presentation transaction data including the identity presentation data to the access node. Conversely, if the visible list does not include the node identification of the access node transmitting the access request, it is determined that the access node does not have the right to access the identity presentation data.

Figure 3:
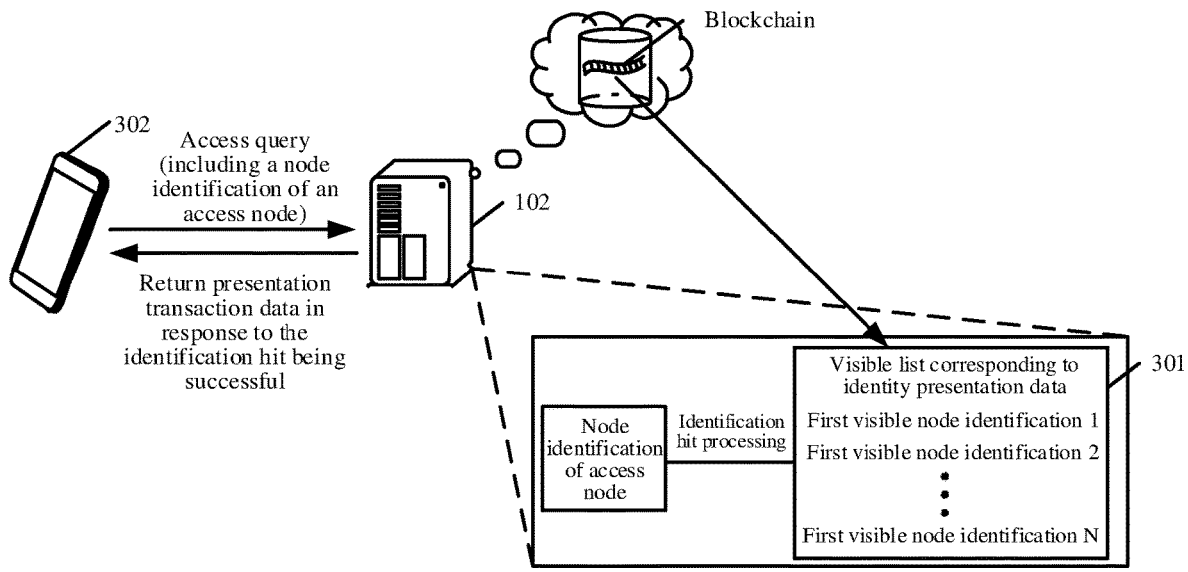
FIG. 3 shows a schematic illustration of identification hit processing provided in an exemplary embodiment of the present disclosure.

An exemplary process of determining whether the access node accesses the identity presentation data by determining whether the visible list includes the node identification of the access node can be seen in FIG. 3. As shown in FIG. 3, the visible list 301 includes the first visible node identification 1, the first visible node identification 2 . . . and the first visible node identification N, where N is an integer greater than 2. The consensus node 102 receives the access request for accessing the identity presentation data transmitted by the access node 302, and then the consensus node 102 can perform identification hit processing on the visible list 301 and specifically can traverse the visible list 301 based on the node identification of the access node 302. If the node identification of the access node 302 exists in the process of traversing the visible list 301, the node identification of the access node 302 is determined as the first visible node identification, which means that the access node 302 is allowed to access the identity presentation data, and the presentation transaction data is returned to the access node 302. Conversely, if it is not detected that any first visible node identification is the same as the node identification of the access node 301 after traversing the visible list 301, it is determined that the access node 302 is not allowed to access the identity presentation data.

In the embodiments of the present disclosure, the holder node may transmit the first data clearing request to the consensus node. As such, the consensus node clears and returns the claim data associated with the holder node from the blockchain in response to the first data clearing request. The holder node then generates the identity presentation data based on the claim data and stores the identity presentation data and the first visible node identification of the node allowed to access the identity presentation data in the blockchain of the blockchain network. In the above scheme, the claim data associated with the holder node and the identity presentation data are both stored in the blockchain of the blockchain network, realizing the decentralized storage of the claim data and the identity presentation data. In addition, the data circulation process of the claim data and the identity presentation data and the visible node setting are performed on the blockchain through the data clearing capability of the holder node. In this way, only the designated node can access the claim data and the identity presentation data, effectively reducing the risk of data leakage and improving the data security.

Figure 4:
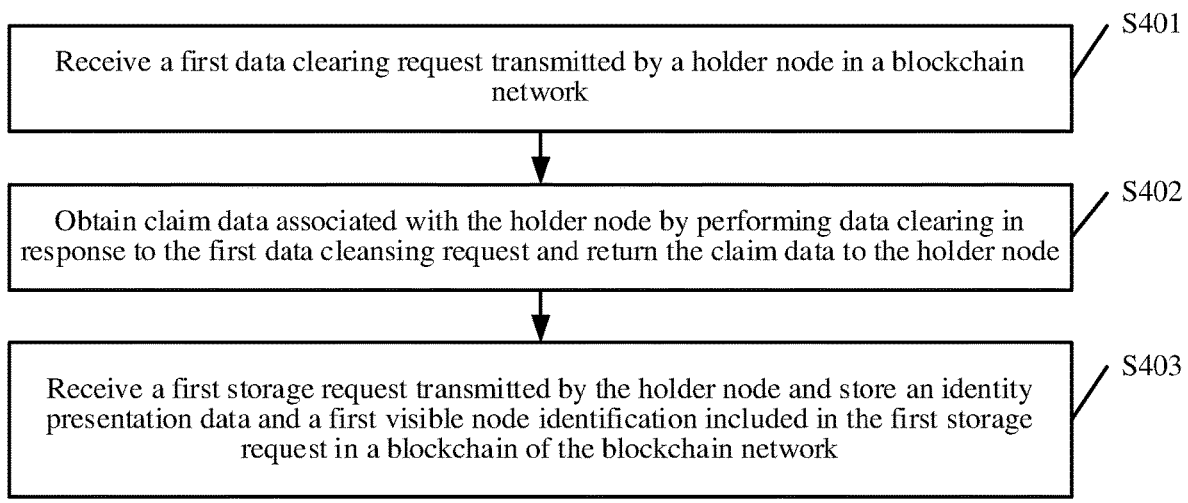
FIG. 4 shows a flowchart of a data processing method based on a blockchain network provided in an exemplary embodiment of the present disclosure.

Reference will be made to FIG. 4, and FIG. 4 shows a flowchart of a data processing method based on a blockchain network provided in an exemplary embodiment of the present disclosure. The data processing method can be performed by the consensus node 102 in the system shown in FIG. 1d, and the data processing method includes, but is not limited to steps S401-S403.

S401: Receive a first data clearing request transmitted by a holder node in a blockchain network.

S402: Obtain claim data associated with the holder node by clearing in response to the first data clearing request and return the claim data to the holder node.

As described above, if the node type of the holder node is a light node, the holder node has a data clearing capability to clear the claim data associated with itself from the consensus network. Then when a target user using the holder node has a need to acquire the claim data from the blockchain, the target user may transmit the first data clearing request to the consensus node in the blockchain network by the holder node. As such, the consensus node clears and returns the claim data associated with the holder node in response to the first data clearing request. The consensus node receiving the first data clearing request may refer to the consensus node which is closest to the holder node in the blockchain network, which can improve the data transmission efficiency. Alternatively, the consensus node may also refer to the node with the highest frequency of the network signal in the blockchain network, which ensures the rapidity and stability of the data transmission. Alternatively, the consensus node can also be connected to one or more light nodes, and the consensus node can perform direct or indirect information communication with the one or more light nodes to which is connected to realize the data transmission. In this embodiment, the holder node can transmit the first data clearing request to a light node connected to the consensus node, and then clear the claim data associated with the holder node from the consensus node by the light node. For example, the consensus node is connected to a light node 1, the light node 1 is connected to a light node 2, and the holder node can transmit the first data clearing request to the light node 2. As such, the claim data associated with the holder node is indirectly cleared from the consensus node by the light node 2 and the light node 1. The embodiments of the present disclosure do not limit which case the consensus node receiving the first data clearing request is specifically mentioned above, which is described herein.

Figure 5:
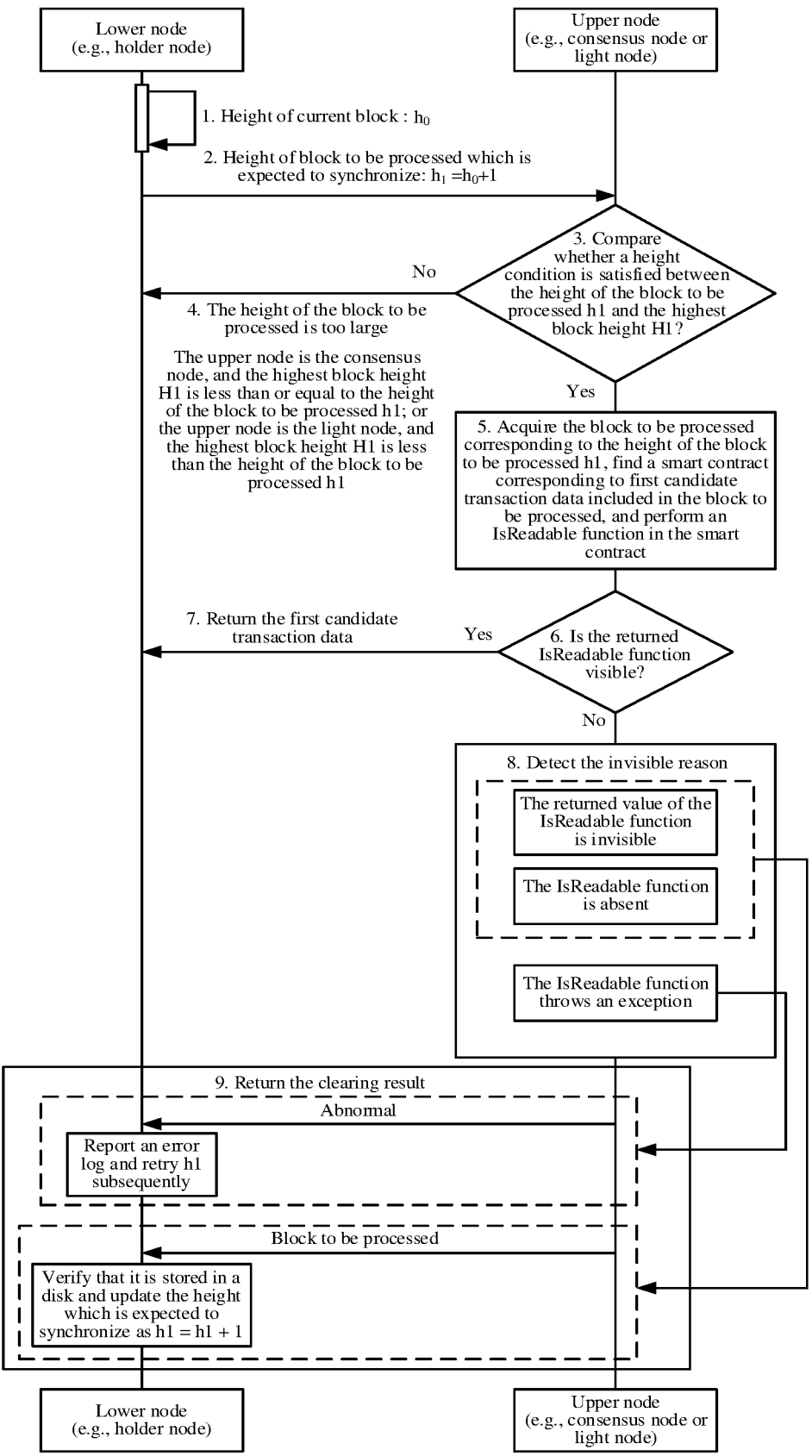
FIG. 5 shows a flowchart of data clearing processing provided in an exemplary embodiment of the present disclosure.

With reference to the flowchart of data clearing processing shown in FIG. 5, the following describes an embodiment of obtaining the claim data associated with the holder node by clearing from the consensus node. As shown in FIG. 5, a lower node is the holder node (or the verifier node), and an upper node is the consensus node or the light node connected to the consensus node. The flow of data clearing processing may include:

1) The consensus node receives a first data clearing request transmitted by the holder node. The first data clearing request is used for requesting to clear the claim data associated with the holder node, and the first data clearing request includes a height of a block to be processed $h_1$ of a block to be processed with which the holder node expects to synchronize, where the $h_1$ is an integer greater than zero. The block height h1 is obtained by adding 1 to the highest block height $h_0$ of the blockchain currently included in the holder node. In some embodiments, the sub-blockchain included in the holder node is different from the blockchain included in the consensus node. Only some data related to the holder node is stored in the blockchain included in the holder node, while the full amount of data in the blockchain network is stored in the blockchain included in the consensus node. In this way, the block to be processed with which the holder node expects to synchronize is usually the next block which is not synchronized in the sub-blockchain included in the holder node. For example, if the current highest block height of the sub-blockchain included in the holder node is 5, then the block height h1 of a block to be processed with which the holder node expects to synchronize=6.

2) The consensus node acquires a highest block height $H_1$ of the blockchain in response to the first data clearing request, the $H_1$ being an integer greater than 1; and performs data clearing processing on the blockchain based on the block height h1 and the acquired highest block height $H_1$ to obtain the claim data associated with the holder node. Specifically, the consensus node compares whether a height condition is satisfied between the block height h1 and the acquired highest block height $H_1$. The height condition being satisfied between the block height h1 and the highest block height $H_1$ means that: if a node type of the consensus node is a light node, i.e., the light node connected to the consensus node receives the first data clearing request, then the block height h1 is less than or equal to the highest block height $H_1$; or, if the node type of the consensus node is a full node, i.e., the consensus node itself receives the first data clearing request, then the block height h1 is less than the highest block height $H_1$.

If the height condition is not satisfied between the block height h1 and the acquired highest block height $H_1$, which indicates that the block height of the block to be processed requested by the holder node is too high, namely, the blockchain included in the consensus node is not yet synchronized to the block to be processed corresponding to the height of the block to be processed, then a notification information is returned to the holder node to indicate the holder node that the consensus node is not synchronized to the block to be processed corresponding to the height of the block to be processed yet. If the height condition is satisfied between the block height h1 and the acquired highest block height $H_1$, which indicates that the blockchain included in the consensus node is synchronized to the block to be processed corresponding to the height of the block to be processed, then the block to be processed corresponding to the height of the block to be processed is acquired from the blockchain, and visibility detection is performed on first candidate transaction data included in the block to be processed to obtain a first visibility detection result. Performing visibility detection on first candidate transaction data included in the block to be processed may include: querying a smart contract corresponding to the first candidate transaction data, the smart contract includes an IsReadable function for performing the visibility detection on the first candidate transaction data; invoking the IsReadable function to perform identification hit processing in a visible list included in the first candidate transaction data so as to detect whether the visible list includes a node identification of the holder node; and generating the first visibility detection result based on the hit result of the identification hit processing and the data included in the first candidate transaction data.

3) The consensus node determines whether a visibility condition is satisfied by the first visibility detection result. The visibility condition being satisfied by the first visibility detection result includes: the holder node being allowed to access the first candidate transaction data, i.e., the visible list in the first candidate transaction data including the node identification of the holder node, and the data included in the first candidate transaction data being the claim data. The visibility condition not being satisfied by the first visibility detection result includes: the holder node not being allowed to access the first candidate transaction data, i.e., the visible list in the first candidate transaction data not including the node identification of the holder node; or, the holder node being allowed to access the first candidate transaction data and the first candidate transaction data not including the claim data; or, the smart contract does not including the IsReadable function; or, an exception occurring in the process of invoking the IsReadable function. The embodiments of the present disclosure do not limit the specific case where the visibility condition is not satisfied by the first visibility detection result.

If the visibility condition is satisfied by the first visibility detection result, then the first candidate transaction data is determined as the claim data associated with the holder node, and the first candidate transaction data is returned to the holder node. On the contrary, if the visibility condition is not satisfied by the first visibility detection result, an invisible reason that the first candidate transaction data cannot be accessed by the holder node is queried. When the invisible reason is that the first candidate transaction data does not include the node identification of the holder node, indicating that the holder node is not set as a node allowed to access the first candidate transaction data; or the invisible reason is that the holder node is allowed to access the first candidate transaction data, and the first candidate transaction data does not include the claim data; or the invisible reason is that the IsReadable function is not included in the smart contract, then a height of a new block to be processed $h_1=h_1+1$, and a highest block height $H_2$ of the updated blockchain in the blockchain network is acquired, the $H_2$ being an integer greater than 1. The step of performing data clearing processing is continued to execute based on the height of the new block to be processed $h_1$ and the block height $H_2$ to obtain the claim data associated with the holder node, in response to that the height condition is satisfied between the height of the new block to be processed $h_1$ and the block height $H_2$. When the invisible reason is that an exception occurs in the process of invoking the IsReadable function or others, the data clearing processing is terminated, and an error notification is transmitted to the holder node. The error notification can notify the holder node that an exception occurs in the current data clearing processing, and retrying is required after repair.

Through the implementation process shown in the above steps 1)-3), the holder node can obtain the claim data associated with the holder node by clearing from the consensus node. Only the data related to the holder node (e.g., claim data) can be cleared from the consensus node using the data clearing capability of the light node SPV (e.g., the holder node). This way ensures the data security that cannot be accessed by the holder node, reduces the storage of irrelevant data by the holder node, and relieves the storage pressure to some extent.

S403: Receive a first storage request transmitted by the holder node and store an identity presentation data and a first visible node identification included in the first storage request in a blockchain of the blockchain network in response to the first storage request.

Specifically, the first storage request carries the identity presentation data produced by the holder node and the set first visible node identification of the node allowed to access the identity presentation data, and consensus is performed on the identity presentation data and the first visible node identification. The consensus can be to verify the correctness of the identity presentation data, such as verifying whether the identity presentation data is generated by the holder node signature, and verifying whether the identity presentation data satisfies the requirements of law and morality. A new block is generated after the consensus is successful, and the new block is added to the blockchain. As such, the identity presentation data and the first visible node identification are stored in the blockchain of the blockchain network, and the security of the storage and circulation of the identity presentation data and the first visible node identification is improved.

In the embodiments of the present disclosure, the consensus node may receive the first data clearing request transmitted by the holder node and clear the claim data associated with the holder node from the blockchain in response to the first data clearing request. As such, clearing the data unrelated to the holder node to the holder node is avoided, the data security stored in the blockchain is maintained, and the storage pressure of the holder node is also relieved. The consensus node can also receive the first storage request transmitted by the holder node. Besides, after the consensus on the identity presentation data carried in the first storage request is successful, the identity presentation data and the first visible node identification are generated into blocks, and the blocks are added to the blockchain. In this way of storing the identity presentation data and the first visible node identification in the blockchain, the security of the identity presentation data and the first visible node identification can be improved.

Figure 6:
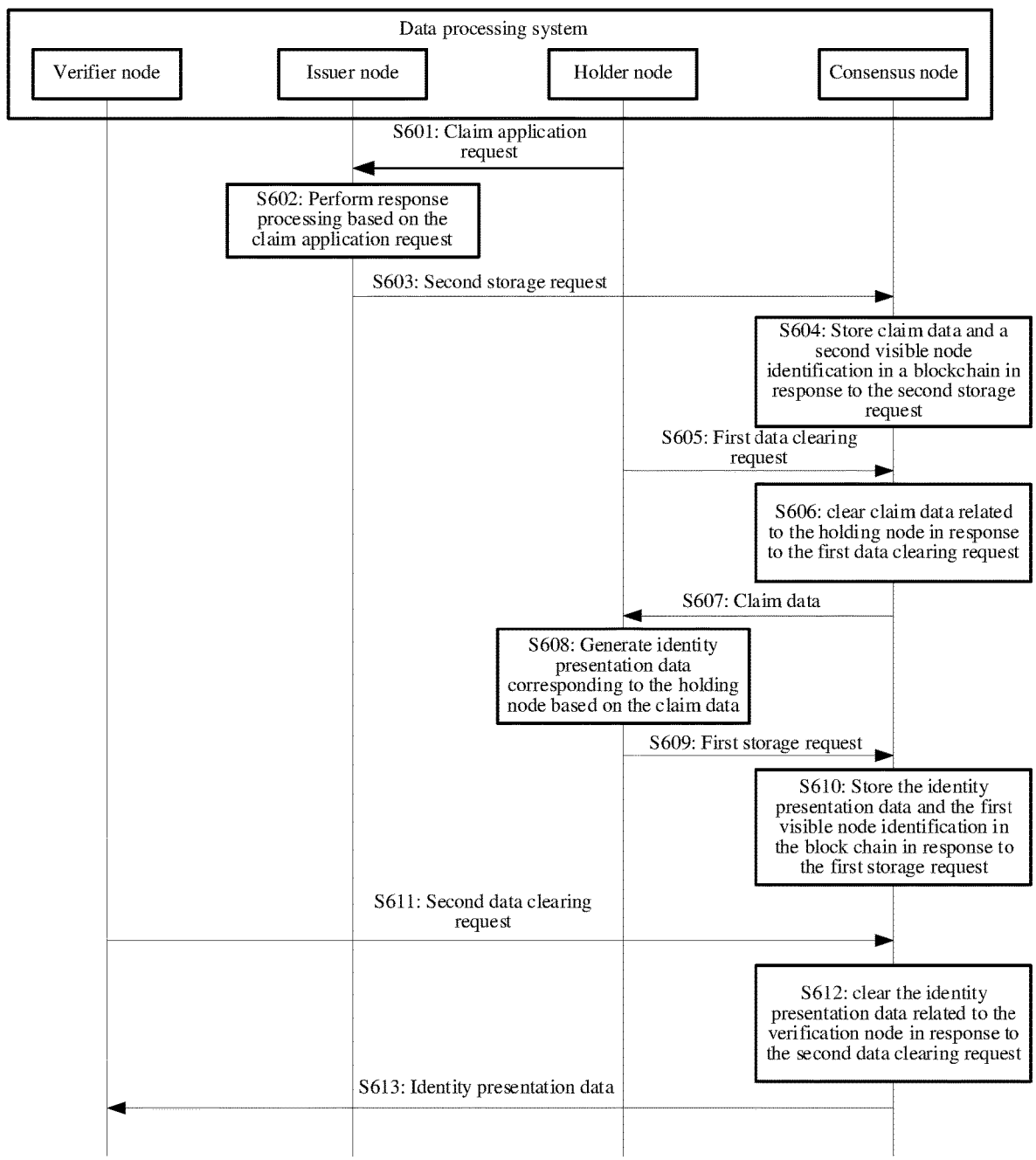
FIG. 6 shows a flowchart of a data processing method based on a blockchain network provided in an exemplary embodiment of the present disclosure.

Reference will be made to FIG. 6, and FIG. 6 shows a flowchart of a data processing method based on a blockchain network provided in an exemplary embodiment of the present disclosure. The data processing method can be performed by the consensus node 102, the issuer node 103, the holder node 104, and the verifier node 105 in the system shown in FIG. 1*d*, and the data processing method includes, but is not limited to steps S601-S613.

S601: A holder node transmits a claim application request to an issuer node in a blockchain network.

S602: The issuer node performs response processing in response to the claim application request.

S603: The issuer node transmits a second storage request to a consensus node.

In steps S601-S603, when a target user using the holder node has a need to apply for the claim data, the target user can transmit the claim application request to the issuer node by the holder node. As such, the issuer node performs response processing based on the claim application request to generate the claim data corresponding to the holder node and store the claim data in the blockchain. The claim application request includes an object identification and candidate object data corresponding to the holder node of the claim data to be applied for. The candidate object data herein may refer to identifiable information about the target user using the holder node to perform the claim application, such as relevant information about user name, user gender, and user age authorized by the user.

Specifically, the flow of the response processing by the issuer node in response to the claim application request may include: first, performing identity verification processing on the holder node based on the claim application request to obtain an identity verification result. The process of the identity verification processing herein may simply include the following: The issuer node transmits an identity query request to the consensus node, the identity query request carrying an object identification corresponding to the holder node; the consensus node queries and returns reference object data associated with the object identification in response to the identity query request; and thus the issuer node receives the reference object data associated with the object identification returned by the consensus node and compares the reference object data with the candidate object data to obtain an identity verification result. If the reference object data matches the candidate object data, the identity verification result is determined to indicate the identity verification is successful; otherwise, if the reference object data does not match the candidate object data, the identity verification result is determined to indicate the identity verification is not successful. The flow may further include: second, generating claim data corresponding to the holder node and determining a second visible node identification of the node allowed to access the claim data, in response to that the identity verification result indicates the identity verification is successful, which means that the identity verification performed by the issuer node on the holder node is successful. The issuer node includes a public key infrastructure (PKI) capable of binding the relevant key pair and the identity of the certificate holder with each other to provide the user with a convenient function of relevant certificate management. Based on this, the issuer node can use the PKI to sign and issue the claim data for the holder node. Finally, the issuer node stores the claim data and the second visible node identification in the blockchain. Specifically, after the issuer node signs and issues the claim data for the holder node and determines the second visible node identification of the node allowed to access the claim data, the issuer node may generate a second storage request based on the claim data and the second visible node identification and transmit the second storage request to the consensus node. As such, the consensus node stores the claim data and the second visible node identification in the blockchain.

S604: The consensus node stores claim data and a second visible node identification in a blockchain in response to the second storage request.

After receiving the second storage request transmitted by the issuer node, the consensus node performs consensus on the claim data and the second visible node identification carried in the second storage request in response to the second storage request, generates a new block based on the claim data and the second visible node identification after the consensus is successful, and adds the new block to the blockchain. As such, the uploading and storage of the claim data and the second visible node identification are realized, and the security of the storage and circulation of the claim data and the second visible node identification is improved. The consensus node performs consensus on the claim data and the second visible node identification for verifying the correctness of the claim data and the second visible node identification. The embodiments of the present disclosure do not limit the specific consensus verification process, which is described herein.

S605: The holder node transmits a first data clearing request to the consensus node.

S606: The consensus node clears claim data associated with the holder node in response to the first data clearing request.

S607: The consensus node returns the obtained the claim data associated with the holder node by clearing to the holder node.

S608: The holder node generates identity presentation data of the holder node based on the claim data and determines a first visible node identification of a node allowed to access the identity presentation data.

S609: The holder node transmits a first storage request to the consensus node.

S610: The consensus node stores the identity presentation data and the first visible node identification in the blockchain in response to the first storage request.

The implementation process shown in steps S65-S610 can be seen in the relevant description of the implementation process in the embodiments shown in FIG. 2 and FIG. 4, which will not be described in detail herein.

S611: A verifier node transmits a second data clearing request to the consensus node.

S612: The consensus node clears the identity presentation data related to the verifier node in response to the second data clearing request.

S613: The consensus node returns the obtained identity presentation data by clearing to the verifier node to enable the verifier node to perform identity verification on the holder node based on the identity presentation data.

In steps S611-S613, when the verifier node has a need to acquire the identity presentation data of the holder node, for example, the recruiting unit often has a need to acquire the signed academic certificate of the student "Xiaoming" in the education verification scenario, then the verifier node may transmit the second data clearing request to the consensus node. The second data clearing request is configured to request the identity presentation data related to the verifier node. The consensus node receives the second data clearing request transmitted by the verifier node, clears the identity presentation data related to the verifier node in response to the second data clearing request, and returns the identity presentation data to the verifier node. Specifically, the consensus node returns the identity presentation data and the first visible node identification of the node allowed to access the identity presentation data (or presentation transaction data generated based on the identity presentation data and the first visible node identification of the node allowed to access the identity presentation data) to the verifier node. As such, the verifier node may perform the identity verification on the holder node based on the identity presentation data and the first visible node identification of the node allowed to access the identity presentation data. The embodiments of performing data clearing processing by the consensus node based on the second data clearing request can be seen in the flowchart of data clearing processing shown in FIG. 5, which will not be described in detail herein.

For example, in the education verification scenario, assuming that the verifier node is the recruiting unit X, when the recruiting unit X has a need to invite the student "Xiaoming" to deliver the resume, the recruiting unit X may transmit the second data clearing request to the consensus node. The second data clearing request may carry the identity identification DID of the student "Xiaoming". As such, the consensus node can clear the academic certificate (such as the identity presentation data) signed by the student "Xiaoming" in response to the second data clearing request and return the academic certificate to the recruiting unit X. It is convenient for the recruiting unit X to verify the authenticity of the academic certificate.

When the verifier node has a need to acquire the identity presentation data of all the users related to itself in the blockchain, the second data clearing request transmitted by the verifier node may also carry the identity identification DID of all the users, or the second data clearing request does not carry the identity identification DID of any user, but only carries the node identification of the verifier node. As such, the consensus node may return all the identity presentation data related to the verifier node stored in the blockchain. The embodiments of the present disclosure do not limit which content or contents are carried in the specific second data clearing request. In addition, the process of performing identity verification by the verifier node specifically based on the identity presentation data is related to a specific identity verification scenario. The embodiments of the present disclosure do not limit the process of performing identity verification by the verifier node, which is described herein. In addition, the verifier node is a node having a need to verify the identity presentation data. As such, the issuer node, the holder node, and the like in the blockchain network can all serve as the verifier node, and the embodiments of the present disclosure do not limit the verifier node.

In the embodiments of the present disclosure, after signing and issuing the claim data of the holder node, the issuer node can upload the claim data to the blockchain. As such, the holder node can acquire the claim data from the blockchain and upload the signed identity presentation data to the blockchain after signing the claim data. It is convenient for the verifier node to acquire the identity presentation data from the blockchain. In the above scheme, the claim data associated with the holder node and the identity presentation data are both stored in the blockchain of the blockchain network, realizing the decentralized storage of the claim data and the identity presentation data. In addition, the data circulation process of the claim data and the identity presentation data and the visible node setting are performed on the blockchain through the data clearing capability of the holder node. In this way, only the designated node can access the claim data and the identity presentation data, effectively reducing the risk of data leakage and improving the data security.

The methods of the embodiments of the present disclosure are set forth in detail above. To facilitate better implementation of the above methods of the embodiments of the present disclosure, the apparatus of the embodiments of the present disclosure is accordingly provided below.

Figure 7:
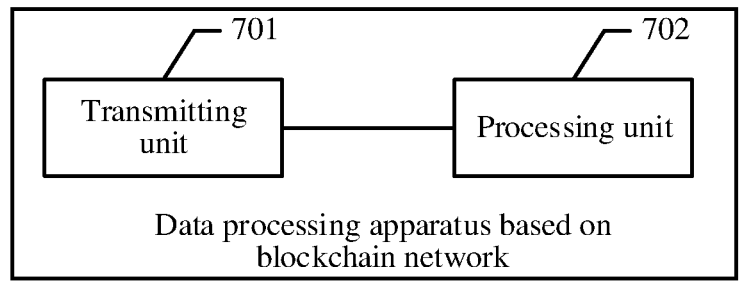
FIG. 7 shows a flowchart of a data processing apparatus based on a blockchain network provided in an exemplary embodiment of the present disclosure.

FIG. 7 shows a schematic structural diagram of a data processing apparatus based on a blockchain network provided in an exemplary embodiment of the present disclosure. The data processing apparatus based on a blockchain network may be a computer-readable instruction (including a program code) running on a holder node. The data processing apparatus based on a blockchain network can be configured to perform some or all of the steps in the method embodiments shown in FIG. 2 and FIG. 6. In addition, the data processing apparatus based on a blockchain network includes the following units:

a transmitting unit 701, configured to transmit a first data clearing request to a consensus node of the blockchain network and receive claim data returned by the consensus node in response to the first data clearing request, the returned claim data being claim data associated with a holder node of the blockchain network obtained by clearing; and a processing unit 702, configured to generate identity presentation data of the holder node based on the claim data, the identity presentation data indicating an identity of the holder node, the processing unit 702 being further configured to determine a first visible node identification of the node allowed to access the identity presentation data, and the processing unit 702 being further configured to store the identity presentation data and the first visible node identification in the blockchain of the blockchain network.

In one embodiment, when the processing unit 702 is configured to generate identity presentation data of the holder node based on the claim data, it is specifically configured to:

sign the claim data and generate the identity presentation data of the holder node.

In one embodiment, the processing unit 702 is further configured to:

transmit a claim application request to an issuer node of the blockchain network to enable the issuer node to perform response processing based on the claim application request and store the requested claim data in the blockchain of the blockchain network.

In one embodiment, the claim application request carries an object identification of the holder node and candidate object data; and the flow of the response processing includes:

performing identity verification processing on the holder node based on the claim application request to obtain an identity verification result;

generating claim data of the holder node and determining a second visible node identification of the node allowed to access the claim data, in response to that the identity verification result indicates the identity verification is successful; and storing the claim data and the second visible node identification in the blockchain of the blockchain network.

In one embodiment, the flow of the identity verification processing includes:

transmitting, by the issuer node, an identity query request to the consensus node, the identity query request carrying an object identification of the holder node;

receiving reference object data associated with the object identification returned by the consensus node; and comparing the reference object data with the candidate object data to obtain an identity verification result.

In one embodiment, when the processing unit 702 is configured to store the identity presentation data and the first visible node identification in the blockchain, it is specifically configured to:

generate presentation transaction data based on the identity presentation data and the first visible node identification; and transmit the presentation transaction data to the consensus node to enable the consensus node to generate a block based on the presentation transaction data and add the block to the blockchain of the blockchain network.

According to an embodiment of the present disclosure, each of the units in the data processing apparatus based on a blockchain network shown in FIG. 7 may be composed by being merged into one or several additional units respectively or entirely, or some unit(s) thereof may also be composed by being split into a plurality of units which are functionally smaller. It may achieve the same operation without affecting the implementation of the technical effect of the embodiments of the present disclosure. The above units are divided based on the logical function. In the practical application, the function of one unit may also be implemented by a plurality of units, or the functions of a plurality of units may be implemented by one unit. In other embodiments of the present disclosure, the data processing apparatus based on a blockchain network may also include other units. In the practical application, these functions may also be implemented with the assistance of other units and may be implemented through the coordination among a plurality of units. According to another embodiment of the present disclosure, a computer-readable instruction (including program code) capable of performing the steps involved in the respective methods as shown in FIG. 2 and FIG. 6 may be run on a general purpose computing device, such as a computer, including a processing element and a storage element such as a central processing unit (CPU), a random access medium (RAM), and a read-only medium (ROM). In this way, the data processing apparatus based on a blockchain network as shown in FIG. 7 may be constructed, and the data processing method based on a blockchain network of the embodiments of the present disclosure may be implemented. The computer-readable instruction may be recorded, for example, on a computer-readable recording medium, loaded into the above computing device by the computer-readable recording medium, and executed therein.

In the embodiments of the present disclosure, the transmitting unit 701 may transmit the first data clearing request to the consensus node. As such, the consensus node clears and returns the claim data associated with the holder node from the blockchain in response to the first data clearing request. The processing unit 702 then generates the identity presentation data based on the claim data and stores the identity presentation data and the first visible node identification of the node allowed to access the identity presentation data in the blockchain of the blockchain network. In the above scheme, the claim data associated with the holder node and the identity presentation data are both stored in the blockchain of the blockchain network, realizing the decentralized storage of the claim data and the identity presentation data. In addition, the data circulation of the claim data and the identity presentation data and the visible node setting are performed on the blockchain through the data clearing capability of the holder node. In this way, only the designated visible node can access the claim data and the identity presentation data, effectively reducing the risk of data leakage and improving the data security.

Figure 8:
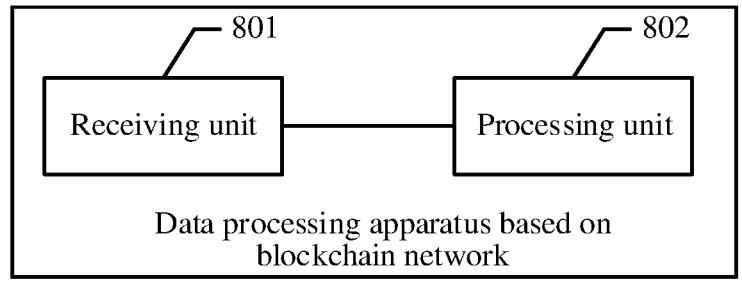
FIG. 8 shows a flowchart of a data processing apparatus based on a blockchain network provided in an exemplary embodiment of the present disclosure.

FIG. 8 shows a schematic structural diagram of a data processing apparatus based on a blockchain network provided in an exemplary embodiment of the present disclosure. The data processing apparatus based on a blockchain network may be a computer-readable instruction (including a program code) running on a holder node. The data processing apparatus based on a blockchain network can be configured to perform some or all of the steps in the method embodiments shown in FIG. 4 and FIG. 6. In addition, the data processing apparatus based on a blockchain network includes the following units:

a receiving unit 801, configured to receive a first data clearing request transmitted by a holder node in the blockchain network, the first data clearing request being configured to request to clear claim data associated with the holder node; and a processing unit 802, configured to obtain the claim data associated with the holder node by clearing in response to the first data clearing request, return the claim data to the holder node to enable the holder node to generate identity presentation data of the holder node based on the claim data, the identity presentation data indicating an identity of the holder node, and determine a first visible node identification of the node allowed to access the identity presentation data, and the processing unit 802 being further configured to receive a first storage request transmitted by the holder node and store the identity presentation data and the first visible node identification included in the first storage request in the blockchain of the blockchain network.

In one embodiment, the first data clearing request includes a height of a block to be processed $h_1$ of a block to be processed with which the holder node expects to synchronize, where the $h_1$ is an integer greater than zero. When the processing unit 802 is configured to obtain the claim data associated with the holder node by clearing in response to the first data clearing request, it is specifically configured to:

acquire a highest block height $H_1$ of the blockchain, the $H_1$ being an integer greater than 1; and perform data clearing processing on the blockchain based on the block height h1 and the highest block height $H_1$ to obtain the claim data associated with the holder node.

In one embodiment, when the processing unit 802 is configured to perform data clearing processing on the blockchain based on the block height h1 and the highest block height $H_1$ to obtain the claim data associated with the holder node, it is specifically configured to:

acquire the block to be processed corresponding to the block height h1 in the blockchain, in response to that a height condition is satisfied between the block height h1 and the highest block height $H_1$, the height condition being satisfied between the block height h1 and the highest block height $H_1$ including: in response to a node type of a consensus node being a light node, the block height h1 being less than or equal to the highest block height $H_1$, or in response to the node type of the consensus node being a full node, the block height h1 being less than the highest block height $H_1$;

perform visibility detection on first candidate transaction data included in the block to be processed to obtain a first visibility detection result;

determine the first candidate transaction data as the claim data associated with the holder node, in response to that a visibility condition is satisfied by the first visibility detection result, the visibility condition being satisfied by the first visibility detection result including: the holder node being allowed to access the first candidate transaction data, and the first candidate transaction data including the claim data;

make a height of a new block to be processed $h_1=h_1+1$ and acquire a highest block height $H_2$ of the updated blockchain in the blockchain network, the $H_2$ being an integer greater than 1, in response to that the visibility condition is not satisfied by the first visibility detection result; and continue to execute the operation of performing data clearing processing based on the height of the new block to be processed $h_1$ and the block height $H_2$ to obtain the claim data associated with the holder node, in response to that the height condition is satisfied between the height of the new block to be processed $h_1$ and the block height $H_2$.

In one embodiment, the processing unit 802 is further configured to:

receive a second storage request transmitted by an issuer node in the blockchain network, the second storage request carrying claim data corresponding to the holder node and a second visible node identification of the node allowed to access the claim data; and store the claim data and the second visible node identification in the blockchain in response to the second storage request.

In one embodiment, the processing unit 802 is further configured to:

receive a second data clearing request transmitted by a verifier node in the blockchain network, the second data clearing request being configured to request identity presentation data related to the verifier node;

obtain the identity presentation data related to the verifier node by clearing in response to the second data clearing request; and return the identity presentation data to the verifier node to enable the verifier node to perform identity verification processing on the holder node based on the identity presentation data.

According to an embodiment of the present disclosure, each of the units in the data processing apparatus based on a blockchain network shown in FIG. 8 may be composed by being merged into one or several additional units respectively or in whole, or some unit(s) thereof may also be composed by being split into a plurality of units which are functionally smaller. It may achieve the same operation without affecting the implementation of the technical effect of the embodiments of the present disclosure. The above units are divided based on the logical function. In the practical application, the function of one unit may also be implemented by a plurality of units, or the functions of a plurality of units may be implemented by one unit. In other embodiments of the present disclosure, the data processing apparatus based on a blockchain network may also include other units. In the practical application, these functions may also be implemented with the assistance of other units and may be implemented through the coordination among a plurality of units. According to another embodiment of the present disclosure, a computer-readable instruction (including program code) capable of performing the steps involved in the respective methods as shown in FIG. 4 and FIG. 6 may be run on a general purpose computing device, such as a computer, including a processing element and a storage element such as a central processing unit (CPU), a random access medium (RAM), and a read-only medium (ROM). In this way, the data processing apparatus based on a blockchain network as shown in FIG. 8 may be constructed, and the data processing method based on a blockchain network of the embodiments of the present disclosure may be implemented. The computer-readable instruction may be recorded, for example, on a computer-readable recording medium, loaded into the above computing device by the computer-readable recording medium, and executed therein.

In the embodiments of the present disclosure, the receiving unit 801 may receive the first data clearing request transmitted by the holder node, and the processing unit 802 may clear the claim data associated with the holder node from the blockchain in response to the first data clearing request. As such, clearing the data unrelated to the holder node to the holder node is avoided, the data security stored in the blockchain is maintained, and the storage pressure of the holder node is also relieved. The consensus node can also receive the first storage request transmitted by the holder node. Besides, after the consensus on the identity presentation data carried in the first storage request is successful, the identity presentation data and the first visible node identification are generated into blocks, and the blocks are added to the blockchain. In this way of storing the identity presentation data and the first visible node identification in the blockchain, the security of the identity presentation data and the first visible node identification can be improved.

Figure 9:
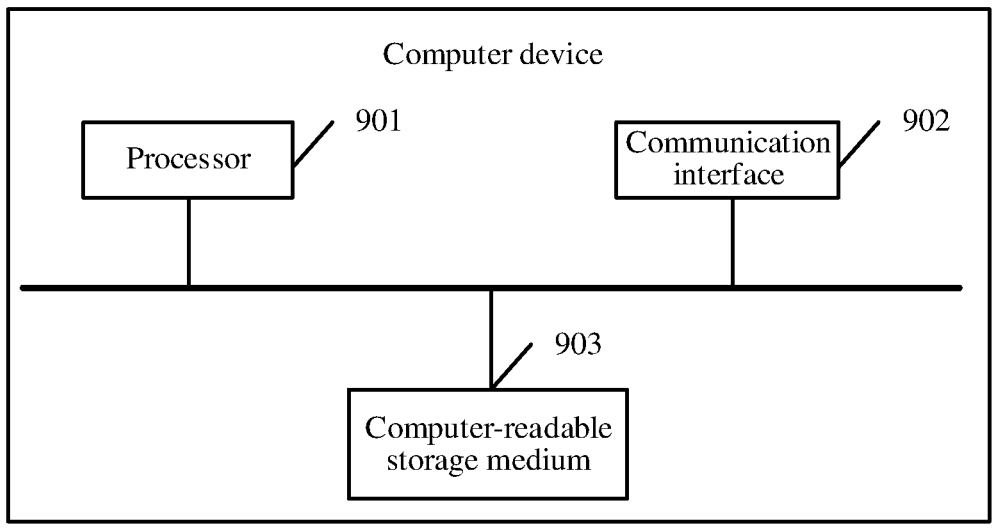
FIG. 9 shows a computer device provided in an exemplary embodiment of the present disclosure.

FIG. 9 shows a schematic structural diagram of a computer device provided in an exemplary embodiment of the present disclosure. With reference to FIG. 9, the terminal includes a processor 901, a communication interface 902, and a computer-readable storage medium 903. The processor 901, the communication interface 902, and the computer-readable storage medium 903 may be connected by a bus or other ways. The communication interface 902 is configured to receive and transmit data. The computer-readable storage medium 903 may be stored in a memory of the terminal, and the computer-readable storage medium 903 is configured to store the computer-readable instruction, including the program instruction. The processor 901 is configured to execute the program instruction stored in the computer-readable storage medium 903. The processor 901 (or the central processing unit (CPU)) is a computing core and a control core of the terminal. It is adapted to implement one or more instructions, and in particular, to load and execute one or more instructions so as to implement the respective method flow or the respective function.

The embodiments of the present disclosure further provide a computer-readable storage medium (Memory). The computer-readable storage medium is a memory device in the terminal configured to store the program and data. It will be appreciated that the computer-readable storage medium herein may include both a built-in storage medium in the terminal and an extended storage medium supported by the terminal. The computer-readable storage medium provides a storage space that stores the processing system of the terminal. In addition, the storage space also stores one or more instructions, which may be one or more computer-readable instructions (including program code), adapted to be loaded and executed by the processor 901. The computer-readable storage medium herein may be either a high-speed RAM or a non-volatile memory, such as at least one disk memory. In some embodiments, it may be at least one computer-readable storage medium away from the aforementioned processor.

In an embodiment, the computer-readable storage medium stores one or more instructions therein. The processor 901 loads and executes one or more instructions stored in the computer-readable storage medium to implement the respective steps in the above embodiments of the data processing method based on a blockchain network. In some embodiments, one or more instructions in the computer-readable storage medium are loaded and executed by the processor 901 to perform the following steps:

transmitting a first data clearing request to a consensus node of the blockchain network and receiving claim data returned by the consensus node in response to the first data clearing request, the returned claim data being claim data associated with the holder node obtained by clearing;

generating identity presentation data of the holder node based on the claim data, the identity presentation data indicating an identity of the holder node;

determining a first visible node identification of the node allowed to access the identity presentation data; and storing the identity presentation data and the first visible node identification in a blockchain of the blockchain network.

In one embodiment, when one or more instructions in the computer-readable storage medium are loaded and executed by the processor 901 to generate identity presentation data of the holder node based on the claim data, they specifically perform the following steps:

signing the claim data and generating the identity presentation data corresponding to the holder node.

In one embodiment, one or more instructions in the computer-readable storage medium are loaded and executed by the processor 901 to further perform the following steps:

transmitting a claim application request to an issuer node of the blockchain network to enable the issuer node to perform response processing based on the claim application request and store the requested claim data in the blockchain of the blockchain network.

In one embodiment, the claim application request carries an object identification of the holder node and candidate object data; and the flow of the response processing includes:

performing identity verification processing on the holder node based on the claim application request to obtain an identity verification result;

generating claim data corresponding to the holder node and determining a second visible node identification of the node allowed to access the claim data, in response to that the identity verification result indicates the identity verification is successful; and storing the claim data and the second visible node identification in the blockchain.

In one embodiment, the flow of the identity verification processing includes:

transmitting, by the issuer node, an identity query request to the consensus node, the identity query request carrying an object identification of the holder node;

receiving reference object data associated with the object identification returned by the consensus node; and comparing the reference object data with the candidate object data to obtain an identity verification result.

In one embodiment, when one or more instructions in the computer-readable storage medium are loaded and executed by the processor 901 to store the identity presentation data and the first visible node identification in the blockchain of the blockchain network, they specifically perform the following steps:

generating presentation transaction data based on the identity presentation data and the first visible node identification; and transmitting the presentation transaction data to the consensus node to enable the consensus node to generate a block based on the presentation transaction data and add the block to a blockchain.

In another embodiment, the computer-readable storage medium stores one or more instructions therein. The processor 901 loads and executes one or more instructions stored in the computer-readable storage medium to implement the respective steps in the above embodiments of the data processing method based on a blockchain network. In some embodiments, one or more instructions in the computer-readable storage medium are loaded and executed by the processor 901 to perform the following steps:

receiving a first data clearing request transmitted by a holder node in the blockchain network, the first data clearing request being configured to request to clear claim data associated with the holder node;

obtaining the claim data associated with the holder node by clearing in response to the first data clearing request, returning the claim data to the holder node to enable the holder node to generate identity presentation data of the holder node based on the claim data, the identity presentation data indicating an identity of the holder node, and determining a first visible node identification of the node allowed to access the identity presentation data; and receiving a first storage request transmitted by the holder node and storing the identity presentation data and the first visible node identification included in the first storage request in a blockchain of the blockchain network.

In one embodiment, the first data clearing request includes a height of a block to be processed $h_1$ of a block to be processed with which the holder node expects to synchronize, where the $h_1$ is an integer greater than zero. When one or more instructions in the computer-readable storage medium are loaded and executed by the processor 901 to obtain the claim data associated with the holder node by clearing in response to the first data clearing request, they specifically perform the following steps:

acquiring a highest block height $H_1$ of the blockchain, the $H_1$ being an integer greater than 1; and performing data clearing processing on the blockchain based on the block height h1 and the highest block height $H_1$ to obtain the claim data associated with the holder node.

In one embodiment method, when one or more instructions in the computer-readable storage medium are loaded and executed by the processor 901 to perform data clearing processing on the blockchain based on the block height h1 and the highest block height $H_1$ to obtain the claim data associated with the holder node, they specifically perform the following steps:

acquiring the block to be processed corresponding to the block height h1 in the blockchain, in response to that a height condition is satisfied between the block height h1 and the highest block height $H_1$, the height condition being satisfied between the block height h1 and the highest block height $H_1$ including: in response to a node type of a consensus node being a light node, the block height h1 being less than or equal to the highest block height $H_1$, or in response to the node type of the consensus node being a full node, the block height h1 being less than the highest block height $H_1$;

performing visibility detection on first candidate transaction data included in the block to be processed to obtain a first visibility detection result;

determining the first candidate transaction data as the claim data associated with the holder node, in response to that a visibility condition is satisfied by the first visibility detection result, the visibility condition being satisfied by the first visibility detection result including: the holder node being allowed to access the first candidate transaction data, and the first candidate transaction data including the claim data;

making a height of a new block to be processed $h_1=h_1+1$ and acquiring a highest block height $H_2$ of the updated blockchain in the blockchain network, the $H_2$ being an integer greater than 1, in response to that the visibility condition is not satisfied by the first visibility detection result; and continuing to execute the operation of performing data clearing processing based on the height of the new block to be processed $h_1$ and the block height $H_2$ to obtain the claim data associated with the holder node, in response to that the height condition is satisfied between the height of the new block to be processed $h_1$ and the block height $H_2$.

In one embodiment, one or more instructions in the computer-readable storage medium are loaded and executed by the processor 901 to further perform the following steps:

receiving a second storage request transmitted by an issuer node in the blockchain network, the second storage request carrying claim data of the holder node and a second visible node identification of the node allowed to access the claim data; and storing the claim data and the second visible node identification in a blockchain in response to the second storage request.

In one embodiment, one or more instructions in the computer-readable storage medium are loaded and executed by the processor 901 to further perform the following steps:

receiving a second data clearing request transmitted by a verifier node in the blockchain network, the second data clearing request being configured to request identity presentation data related to the verifier node;

obtaining the identity presentation data related to the verifier node by clearing in response to the second data clearing request; and returning the identity presentation data to the verifier node to enable the verifier node to perform identity verification processing on the holder node based on the identity presentation data.

In the embodiments of the present disclosure, the holder node may transmit the first data clearing request to the consensus node. As such, the consensus node clears and returns the claim data associated with the holder node from the blockchain in response to the first data clearing request. The holder node then generates the identity presentation data based on the claim data and stores the identity presentation data and the first visible node identification of the node allowed to access the identity presentation data in the blockchain of the blockchain network. In the above scheme, the claim data associated with the holder node and the identity presentation data are both stored in the blockchain of the blockchain network, realizing the decentralized storage of the claim data and the identity presentation data. In addition, the data circulation of the claim data and the identity presentation data and the visible node setting are performed on the blockchain through the data clearing capability of the holder node. In this way, only the designated visible node can access the claim data and the identity presentation data, effectively reducing the risk of data leakage and improving the data security.

The embodiments of the present disclosure further provide a computer program product, including a computer instruction. The computer instruction is stored in a computer-readable storage medium. The processor of the data processing device reads the computer instruction from the computer-readable storage medium, and the processor executes the computer instruction to cause the data processing device to perform the above data processing method based on a blockchain network.

Those skilled in the art will recognize that the units and algorithm steps of various examples described in connection with the embodiments disclosed in the present disclosure may be implemented in electronic hardware or a combination of computer software and electronic hardware. Whether these functions are performed in hardware or software depends upon the particular application and design constraint imposed on the technical solution. Skilled artisans may implement the described functions in various ways for each particular application, but such implementation is not interpreted as departing from the scope of the present disclosure.

In the embodiments described above, it may be implemented in whole or in part cby software, hardware, firmware, or any combination thereof. When the software implementation is used, it may be implemented in whole or in part as a computer program product. The computer program product includes one or more computer instructions. When the computer-readable instruction is loaded and executed on a computer, the processes or functions described in the embodiments of the present disclosure are produced in whole or in part. The computer may be a general purpose computer, a special purpose computer, a computer network, or other programmable devices. The computer instruction may be stored in or transmitted by the computer-readable storage medium. The computer instruction may be transmitted from a website site, computer, server, or data center to another website site, computer, server, or data center by wired (e.g., coaxial cable, fiber optic, and digital subscriber line (DSL)) or wireless (e.g., infrared, wireless, and microwave) ways. The computer-readable storage medium may be any available medium that can be accessed by the computer or the data processing device including a server and a data center integrated by one or more available media. The available medium may be a magnetic medium (e.g., floppy disk, hard disk, and magnetic tape), an optical medium (e.g., DVD), a semiconductor medium (e.g., solid state disk, SSD), or the like.

The above is only the example embodiments of the present disclosure, but the scope of protection of the present disclosure is not limited thereto. It will be apparent to those skilled in the art that various changes and substitutions may be made without departing from the scope of protection of the present disclosure. Accordingly, the scope of protection of the present disclosure is as set forth in the claims below.

What is claimed is:

1. A data processing method based on a blockchain network, executed by a holder node in the blockchain network, the method comprising:
    transmitting a first data clearing request to a consensus node of the blockchain network and receiving claim data returned by the consensus node in response to the first data clearing request, the returned claim data being claim data associated with the holder node obtained by clearing;
    generating identity presentation data of the holder node based on the claim data, the identity presentation data indicating an identity of the holder node;
    determining a first visible node identification of a node having access to the identity presentation data; and
    storing the identity presentation data and the first visible node identification in a blockchain of the blockchain network.

2. The method according to claim 1, wherein the generating identity presentation data of the holder node based on the claim data comprises:
    signing the claim data to generate the identity presentation data of the holder node.

3. The method according to claim 1, further comprising:
    transmitting a claim application request to an issuer node of the blockchain network, wherein the claim application is processed by the issuer node to generate requested claim data and store the requested claim data in the blockchain of the blockchain network.

4. The method according to claim 3, wherein:
    the claim application request carries an object identification of the holder node and candidate object data; and
    the object identification of the holder node and the candidate object data are configured to facilitate identity verification of the holder node performed by the issuer node.

5. The method according to claim 1, wherein the storing the identity presentation data and the first visible node identification in a blockchain of the blockchain network comprises:
    generating presentation transaction data based on the identity presentation data and the first visible node identification; and
    transmitting the presentation transaction data to the consensus node to enable the consensus node to generate a block based on the presentation transaction data and add the block to the blockchain of the blockchain network.

6. A data processing method based on a blockchain network, executed by a consensus node in the blockchain network, the method comprising:
    receiving a first data clearing request transmitted by a holder node in the blockchain network, the first data clearing request being configured to request to clear claim data associated with the holder node;
    perform data clearing and obtaining the claim data associated with the holder node in response to the first data clearing request, returning the claim data to the holder node; and
    receiving a first storage request transmitted by the holder node and storing an identity presentation data and a first visible node identification comprised in the first storage request in a blockchain of the blockchain network, wherein the identity presentation data is generated by the holder node based on the claim data, and the first visible node identification indicating a node having access to the identity presentation data is determined by the holder node.

7. The method according to claim 6, wherein the first data clearing request comprises a block height $h_1$ of a block to be processed with which the holder node expects to synchronize, the $h_1$ being an integer greater than zero; and the obtaining the claim data associated with the holder node in response to the first data clearing request comprises:
    acquiring a highest block height $H_1$ of the blockchain, the $H_1$ being an integer greater than 1; and
    performing data clearing processing on the blockchain based on the block height h1 and the highest block height $H_1$ to obtain the claim data associated with the holder node.

8. The method according to claim 7, wherein the performing data clearing processing on the blockchain based on the block height h1 and the highest block height $H_1$ to obtain the claim data associated with the holder node comprises:
    acquiring the block to be processed corresponding to the block height h1 in the blockchain, in response to that a height condition is satisfied between the block height h1 and the highest block height $H_1$;
    performing visibility detection on first candidate transaction data comprised in the block to be processed to obtain a first visibility detection result;
    determining the first candidate transaction data as the claim data associated with the holder node, in response to that a visibility condition is satisfied by the first visibility detection result;
    making a height of a new block to be processed $h_1=h_1+1$ and acquiring a highest block height $H_2$ of an updated blockchain in the blockchain network, the $H_2$ being an integer greater than 1, in response to that the visibility condition is not satisfied by the first visibility detection result; and
    continuing to perform the data clearing processing based on the height of the new block to be processed $h_1$ and the block height $H_2$ to obtain the claim data associated with the holder node, in response to that the height condition is satisfied between the height of the new block to be processed $h_1$ and the block height $H_2$.

9. The method according to claim 8, wherein the height condition being satisfied between the block height h1 and the highest block height $H_1$ comprises: in response to a node type of a consensus node being a light node, the block height h1 being less than or equal to the highest block height $H_1$; or in response to the node type of the consensus node being a full node, the block height h1 being less than the highest block height $H_1$.

10. The method according to claim 8, wherein the visibility condition being satisfied by the first visibility detection result comprises: the holder node being granted access to the first candidate transaction data, and the first candidate transaction data comprises the claim data.

11. The method according to claim 8, further comprising:
in response to that the height condition is not satisfied between the block height h1 and the highest block height $H_1$, returning a notification to the holder node to indicate that the consensus node is not synchronized to the block to be processed yet.

12. The method according to claim 6, further comprising:
receiving a second storage request transmitted by an issuer node in the blockchain network, the second storage request carrying claim data corresponding to the holder node and a second visible node identification indicating a node having access to the claim data; and
storing the claim data and the second visible node identification in the blockchain of the blockchain network in response to the second storage request.

13. The method according to claim 6, further comprising:
receiving a second data clearing request transmitted by a verifier node in the blockchain network, the second data clearing request being configured to request identity presentation data related to the verifier node;
perform data clearing and obtaining the identity presentation data related to the verifier node in response to the second data clearing request; and
returning the identity presentation data related to the verifier node to the verifier node to enable the verifier node to perform identity verification processing on the holder node based on the identity presentation data related to the verifier node.

14. A non-transitory computer-readable storage medium, configured to store at least one computer program therein, the at least one computer program being loaded and executed by one or more processors of a consensus node to implement:
receiving a first data clearing request transmitted by a holder node in the blockchain network, the first data clearing request being configured to request to clear claim data associated with the holder node;
performing data clearing and obtaining the claim data associated with the holder node in response to the first data clearing request, returning the claim data to the holder node; and
receiving a first storage request transmitted by the holder node and storing an identity presentation data and a first visible node identification comprised in the first storage request in a blockchain of the blockchain network, wherein the identity presentation data is generated by the holder node based on the claim data, and the first visible node identification indicating a node having access to the identity presentation data is determined by the holder node.

15. The storage medium according to claim 14, wherein the first data clearing request comprises a block height $h_1$ of a block to be processed with which the holder node expects to synchronize, the $h_1$ being an integer greater than zero; and the obtaining the claim data associated with the holder node in response to the first data clearing request comprises:
acquiring a highest block height $H_1$ of the blockchain, the $H_1$ being an integer greater than 1; and
performing data clearing processing on the blockchain based on the block height h1 and the highest block height $H_1$ to obtain the claim data associated with the holder node.

16. The storage medium according to claim 15, wherein the performing data clearing processing on the blockchain based on the block height h1 and the highest block height $H_1$ to obtain the claim data associated with the holder node comprises:
acquiring the block to be processed corresponding to the block height h1 in the blockchain, in response to that a height condition is satisfied between the block height h1 and the highest block height $H_1$;
performing visibility detection on first candidate transaction data comprised in the block to be processed to obtain a first visibility detection result;
determining the first candidate transaction data as the claim data associated with the holder node, in response to that a visibility condition is satisfied by the first visibility detection result;
making a height of a new block to be processed $h_1=h_1+1$ and acquiring a highest block height $H_2$ of an updated blockchain in the blockchain network, the $H_2$ being an integer greater than 1, in response to that the visibility condition is not satisfied by the first visibility detection result; and
continuing to perform the data clearing processing based on the height of the new block to be processed $h_1$ and the block height $H_2$ to obtain the claim data associated with the holder node, in response to that the height condition is satisfied between the height of the new block to be processed $h_1$ and the block height $H_2$.

17. The storage medium according to claim 16, wherein the height condition being satisfied between the block height h1 and the highest block height $H_1$ comprises: in response to a node type of a consensus node being a light node, the block height h1 being less than or equal to the highest block height $H_1$; or in response to the node type of the consensus node being a full node, the block height h1 being less than the highest block height $H_1$.

18. The storage medium according to claim 16, wherein the visibility condition being satisfied by the first visibility detection result comprises: the holder node being granted access to the first candidate transaction data, and the first candidate transaction data comprises the claim data.

19. The storage medium according to claim 14, wherein the at least one computer program further causes one or more processors to implement:
receiving a second storage request transmitted by an issuer node in the blockchain network, the second storage request carrying claim data corresponding to the holder node and a second visible node identification indicating a node having access to the claim data; and
storing the claim data and the second visible node identification in the blockchain of the blockchain network in response to the second storage request.

20. The storage medium according to claim 14, wherein the at least one computer program further causes one or more processors to implement:
receiving a second data clearing request transmitted by a verifier node in the blockchain network, the second data clearing request being configured to request identity presentation data related to the verifier node;
performing data clearing and obtaining the identity presentation data related to the verifier node in response to the second data clearing request; and returning the identity presentation data related to the verifier node to the verifier node to enable the verifier node to perform identity verification processing on the holder node based on the identity presentation data related to the verifier node.

* * * * *